(12) United States Patent
Yu et al.

(10) Patent No.: US 10,171,200 B2
(45) Date of Patent: Jan. 1, 2019

(54) OPTICAL COMMUNICATION USING SUPER-NYQUIST SIGNALS

(71) Applicant: ZTE Corporation, Shenzhen (CN)

(72) Inventors: Jianjun Yu, Basking Ridge, NJ (US); Junwen Zhang, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/915,081

(22) PCT Filed: Aug. 26, 2014

(86) PCT No.: PCT/CN2014/085223
§ 371 (c)(1),
(2) Date: Feb. 26, 2016

(87) PCT Pub. No.: WO2015/027903
PCT Pub. Date: Mar. 5, 2015

(65) Prior Publication Data
US 2016/0211939 A1      Jul. 21, 2016

Related U.S. Application Data

(60) Provisional application No. 61/870,749, filed on Aug. 27, 2013.

(51) Int. Cl.
*H04B 10/12* (2006.01)
*H04B 10/04* (2006.01)
(Continued)

(52) U.S. Cl.
CPC .......... *H04J 14/06* (2013.01); *H04B 10/5561* (2013.01); *H04B 10/61* (2013.01); *H04L 27/34* (2013.01); *H04B 10/2507* (2013.01)

(58) Field of Classification Search
None
See application file for complete search history.

(56) References Cited

U.S. PATENT DOCUMENTS

| | | | |
|---|---|---|---|
| 5,970,093 A | 10/1999 | de Lantremange | |
| 6,215,430 B1 * | 4/2001 | Smith | H03D 7/00 341/144 |

(Continued)

FOREIGN PATENT DOCUMENTS

| | | |
|---|---|---|
| CN | 1300477 A | 6/2001 |
| CN | 1307768 A | 8/2001 |

(Continued)

OTHER PUBLICATIONS

Buset et al., Experimental Demonstration of a 10 Gb/s Subcarrier Multiplexed WDM PON, Aug. 1, 2013, IEEE, pp. 1434-1438.*
(Continued)

*Primary Examiner* — Ken N Vanderpuye
*Assistant Examiner* — Jai Lee
(74) *Attorney, Agent, or Firm* — Perkins Coie LLP

(57) ABSTRACT

An optical transmitter multiplexes multiple optical channels for transmission over an optical communication medium. The spectrum of modulated signal in each optical channel is lowpass filtered in the electrical (digital) domain at half the channel baud rate such that super Nyquist signal multiplexing can be achieved in the optical domain without having to perform optical filtering. An optical coupler may be used to multiplex the multiple optical channels.

26 Claims, 19 Drawing Sheets

(51) Int. Cl.
*H04J 14/06* (2006.01)
*H04B 10/556* (2013.01)
*H04B 10/61* (2013.01)
*H04L 27/34* (2006.01)
*H04B 10/2507* (2013.01)

(56) References Cited

U.S. PATENT DOCUMENTS

| | | | |
|---|---|---|---|
| 6,327,311 B1* | 12/2001 | Ojard | H04L 1/04 |
| | | | 375/261 |
| 6,559,898 B1* | 5/2003 | Citta | H04N 5/21 |
| | | | 348/21 |
| 7,027,500 B1 | 4/2006 | Casas et al. | |
| 7,835,259 B1 | 11/2010 | Isaksen et al. | |
| 8,073,326 B2* | 12/2011 | Yan | H04J 14/06 |
| | | | 398/152 |
| 8,204,377 B2* | 6/2012 | Liu | H04J 14/06 |
| | | | 398/158 |
| 8,311,417 B1 | 11/2012 | Poggiolini et al. | |
| 8,532,502 B2 | 9/2013 | Zhang et al. | |
| 9,225,429 B2* | 12/2015 | Yu | H04B 10/616 |
| 9,559,778 B2* | 1/2017 | McNicol | H04B 10/25137 |
| 2003/0223507 A1* | 12/2003 | De Gaudenzi | H04L 27/3411 |
| | | | 375/279 |
| 2004/0141569 A1* | 7/2004 | Agazzi | H04B 10/2575 |
| | | | 375/302 |
| 2005/0129148 A1 | 6/2005 | Isaksen et al. | |
| 2005/0220203 A1* | 10/2005 | Ojard | H04L 5/06 |
| | | | 375/261 |
| 2006/0290543 A1* | 12/2006 | Ye | H03H 17/028 |
| | | | 341/61 |
| 2007/0018876 A1* | 1/2007 | Jiang | H03H 17/0226 |
| | | | 341/156 |
| 2009/0232253 A1* | 9/2009 | Letunov | H04L 27/206 |
| | | | 375/298 |
| 2009/0245816 A1 | 10/2009 | Liu et al. | |
| 2010/0014559 A1* | 1/2010 | Nieto | H04J 13/0048 |
| | | | 375/130 |
| 2010/0014873 A1 | 1/2010 | Bulow | |
| 2012/0084619 A1 | 4/2012 | Kuschnerov et al. | |
| 2012/0263468 A1* | 10/2012 | Yaman | H04B 10/5167 |
| | | | 398/65 |
| 2013/0136210 A1 | 5/2013 | Khayrallah et al. | |
| 2013/0138375 A1 | 5/2013 | Zhou et al. | |
| 2013/0223843 A1 | 8/2013 | Jia et al. | |
| 2013/0308960 A1 | 11/2013 | Horikoshi et al. | |
| 2014/0099116 A1* | 4/2014 | Bai | H04B 10/532 |
| | | | 398/76 |
| 2014/0212132 A1 | 7/2014 | Saito et al. | |
| 2014/0233966 A1 | 8/2014 | Yu et al. | |
| 2015/0086193 A1* | 3/2015 | Liu | H04B 10/2543 |
| | | | 398/28 |
| 2016/0065313 A1 | 3/2016 | Yu et al. | |

FOREIGN PATENT DOCUMENTS

| | | |
|---|---|---|
| CN | 1491510 A | 4/2004 |
| CN | 101478350 A | 7/2009 |
| EP | 1 251 690 A2 | 10/2002 |
| EP | 2 464 069 A2 | 6/2012 |
| JP | 2002-344822 A | 11/2002 |
| JP | 2012124782 A | 6/2012 |
| WO | 1999/046866 A1 | 9/1999 |
| WO | 1999/063694 A1 | 12/1999 |
| WO | 2002/051041 A2 | 6/2002 |
| WO | 2012/108421 A1 | 8/2012 |

OTHER PUBLICATIONS

Storr, Wayne, Electronics Tutorial about Butterworth Filters, Jul. 26, 2013, http://www.electronics-tutorials.ws/filter/filter_8.html.*
Smith, Steven W., Digital Signal Processing: A Practical Guide for Engineers and Scientists, 2003, Elsevier Science, pp. 128-130.*
Wikipedia, Raised-cosine filter, Jul. 8, 2013, http://en.wikipedia.org/wiki/Raised-cosine_filter.*
Lu et al., Flexible high-order QAM transmitter using tandem IQ modulators for generating 16/32/36/64-QAM with balanced complexity in electronics and optics, Mar. 2013, Optical Society of America, pp. 6213-6223.*
Zhou et al., Spectrally-Efficient High-Speed Optical Transmission Technologies, 2012.*
Tao et al., Experimental demonstration of 10 Gb/s multi-level carrier-less amplitude and phase modulation for short range optical communicaiton systems, Mar. 2013, Optical Society of America, pp. 6459-6465.*
Smith, Steven W., Digital Signal Processing: A Practical Guide for Engineers and Scientists, 2003, Newnes, pp. 128-130.*
Buset et al., Experimental Demonstration of a 10 Gb/s Subcarrier Multiplexed WDM PON, Aug. 1, 2013, IEEE, pp. 1435-1438.*
McCune, Earl, Practical Digital Wireless Signals, 2010, Cambridge University Press, pp. 40-42.*
Reed, Jeffrey H., Software Radio: A Modern Approach to Radio Engineering, 2002, Prentice Hall PTR, pp. 73-74.*
Saini et al., Optimal Design RRC Pulse Shape Polyphase FIR Decimation Filter for Multi-Standard Wireless Transceivers, 2012, IJARCET, pp. 237-244.*
Ansari et al., Media Access Control and Resource Allocation, Jan. 17, Springer Sceince & Business Media, pp. 17-20.*
Chien et al., Performance Assessment of Noise-Suppressed Nyquist-WDM for Terabit Superchannel Transmission, 2012, IEEE, pp. 3965-3971.*
Buset et al., Experimental Demonstration of a 10 Gb/s Subcarrier Multiplexed WDM PON, Aug. 1, 2013, IEEE, p. 1435-1438.*
Bertran-Pardo, O., et al., "Submarine transmissions with spectral efficiency higher than 3 b/s/Hz using Nyquist pulse-shaped channels," Optical Fiber Communication Conference/National Fiber Optic Engineers Conference 2013, OSA Technical Digest (online) (Optical Society of America, 2013), Anaheim, California, USA, Paper OTu2B.1, pp. 1-3, Mar. 2013.
Bosco, G., et al., "Performance Limits of Nyquist-WDM and CO-OFDM in High-Speed PM-QPSK Systems," IEEE Photonics Technology Letters, 22(15):1129-1131, Aug. 2010.
Bosco, G., et al., "On the Performance of Nyquist-WDM Terabit Superchannels Based on PM-BPSK, PM-QPSK, PM-8QAM or PM-16QAM Subcarriers," Journal of Lightwave Technology, 29(1):53-61, Jan. 2011.
Cai, J.-X., "100G Transmission Over Transoceanic Distance with High Spectral Efficeincy and Large Capacity," Journal of Lightwave Technology, 30(24):3845-3856, Dec. 2012.
Chang, D., et al., "LDPC Convolutional Codes using Layered Decoding Algorithm for High Speed Coherent Optical Transmission," Optical Fiber Communication Conference, OSA Technical Diges (Optical Society of America), Los Angeles, California, USA, Paper OW1H.4, pp. 1-3, Mar. 2012.
Dong, Z., et al., "7×224 Gb/s/ch Nyquist-WDM Transmission Over 1600-km SMF-28 Using PDM-CSRZ-QPSK Modulation," IEEE Photonics Technology Letters, 24(13):1157-1159, Jul. 2012.
Huang, B., et al., "Robust 9-QAM digital recovery for spectrum shaped coherent QPSK signal," Optics Express, 21(6):7216-7221, Mar. 2013.
International Search Report and Written Opinion dated Nov. 25, 2014 for International Application No. PCT/CN2014/085223, filed on Aug. 26, 2014 (11 pages).
Kikuchi, K., et al., "Coherent Demodulation of Optical Quadrature Duobinary Signal with Spectral Efficiency of 4 bit/s/Hz per Polarization," 33rd European Conference and Exhibition of Optical Communication (ECOC), Berlin, Germany, Paper 9.3.4, pp. 1-2, Sep. 2007.
Li, J., et al., "Approaching Nyquist Limi in WDM Systems By Low-Complexity Receiver-Side Duobinary Shaping," Journal of Lightwave Technology, 30(11):1664-1676, Jun. 2012.
Li, J., et al., "Building up low-complexity spectrally-efficient Terabit superchannels by receiver-side duobinary shaping," Optics Express, 20(9):10271-10282, Apr. 2012.

(56) References Cited

OTHER PUBLICATIONS

Liu, X., et al., "Transmission of a 448-Gb/s Reduced-Guard-Interval CO-OFDM Signal with a 60-GHz Optical Bandwidth over 2000 km of ULAF and Five 80-GHz-Grid ROADMs," National Fiber Optic Engineers Conference, OSA Technical Digest (CD)(Optical Society of America), San Diego, California, USA, Paper PDPC2, pp. 1-3, Mar. 2010.
Lyubomirsky, I., "Quadrature Duobinary for High-Spectral Efficiency 100G Transmission," Journal of Lightwave Technology, 28(1):91-96, Jan. 2010.
Machi, F., et al., "111-Gb/s PolMux-Quadrature Duobinary for Robust and Bandwidth Efficient Transmission," IEEE Photonics Technology Letters, 22(11):751-753, Jun. 2010.
Oerder, M., et al., "Digital Filter and Square Timing Recovery," IEEE Transactions on Communications, 36(5):605-612, May 1988.
Pfau, T., et al., "Hardware-Efficient Coherent Digital Receiver Concept With Feedforward Carrier Recovery for M-QAM Constellations," Journal of Lightwave Technology, 27(8):989-999, Apr. 2009.
Schmogrow, R., et al., "Real-time Nyquist pulse generation beyond 100 Gbit/s and its relation to OFDM," Optics Express, 20(1):317-337, Jan. 2012.
Selmi, M., et al., "Accurate Digital Frequency Offset Estimator for Coherent PolMux QAM Transmission Systems," 35th European Conference on Optical Communication (ECOC '09), Vienna, Austria, Paper P3.08, pp. 1-2, Sep. 2009.
Wang, J., et al., "Generation of Spectrally Efficient Nyquist-WDM QPSK Signals Using Digital FIR or FDE Filters at Transmitters," Journal of Lightwave Technology, 30(23):3679-3686, Dec. 2012.
Wang, J., et al., "Generation of Spectrally Efficient Nyquist-WDM QPSK Signals using DSP Techniques at Transmitter," Optical Fiber Communication Conference, OSA Technical Digest (Optical Society of America, 2012), Los Angeles, California, USA, Paper OM3H.5, pp. 1-3, Mar. 2012.
Winzer, P.J., et al., "Generation and 1,200-km Transmission of 448-Gb/s ETDM 56-Gbaud PDM 16-QAM using a Single I/Q Modulator," 2010 36th European Conference and Exhibition on Optical Communication (ECOC), Torino, Italy, Paper PDP2.2, pp. 1-3, Sep. 2010.
Xia, T.J., et al., "Field Experiment with Mixed Line-Rate Transmission (112-Gb/s, 450-Gb/s, and 1.15-TB/s) over 3,560 km of Installed Fiber Using Filterless Coherent Receiver and EDFAs Only," Optical Fiber Communication Conference/National Fiber Optic Engineers Conference 2011, OSA Technical Digest (CD)(Optical Society of America), Los Angeles, California, USA, Paper PDPA3, pp. 1-3, Mar. 2011.
Xu, X., et al., "Decision Directed Least Radius Distance Algorithm for Blind Equalization in a Dual-polarization 16-QAM System," Optical Fiber Communication Conference and Exposition and the National Fiber Optic Engineers Conference (OFC/NFOEC 2012), Los Angeles, California, USA, Paper OM2H.5, pp. 1-3, Mar. 2012.
Yu, J., et al., "Field Trial Nyquist-WDM Transmission of 8×216.4Gb/s PDM-CSRZ-QPSK Exceeding 4b/s/Hz Spectral Efficiency," National Fiber Optic Engineers Conference, OSA Technical Digest (Optical Society of America), Los Angeles, Califronia, USA, Paper PDP5D.3, pp. 1-3, Mar. 2012.
Yu, J., et al., "Transmission of 200 G PDM-CSRZ-QPSK and PDM-16 QAM With a SE of 4 b/s/Hz," Journal of Lightwave Technology, 31(4):515-522, Feb. 2013.
Zhang, J., et al., "Multi-Modulus Blind Equalizations for Coherent Quadrature Duobinary Spectrum Shaped PM-QPSK Digital Signal Processing," Journal of Lightwave Technology, 31(7):1073-1078, Apr. 2013.
Zhou, X., et al., "4000km Transmission of 50GHz spaced, 10×494.85-Gb/s Hybrid 32-64QAM using Cascaded Equalization and Training-Assisted Phase Recovery," National Fiber Optic Engineers Conference, OSA Technical Digest (Optical Society of America) Los Angeles, California, USA, Paper PDP5C.6, pp. 1-3, Mar. 2012.
Zhou, X., et al., "400G WDM Transmission on the 50 GHz Grid for Future Optical Networks," Journal of Lightwave Technology, 30(24):3779-3792, Dec. 2012.
Zhou, X., et al., "8×450-Gb/s, 50-GHz-Spaced, PDM-32QAM transmission over 400km and one 50GHz-grid ROADM," Optical Fiber Communication Conference/National Fiber Optic Engineers Conference 2011, OSA Technical Digest (CD) (Optical Society of America), Los Angeles, California, USA, Paper PDPB3, pp. 1-3, Mar. 2011.
Zhou, X., et al., "High Spectral Efficiency 400 Gb/s Transmission Using PDM Time-Domain Hybrid 32-64 QAM and Training-Assisted Carrier Recovery," Journal of Lightwave Technology, 31(7):999-1005, Apr. 2013.
Oi, J., et al., "Generation of 28GBaud and 32GBaud PDM-Nyquist-QPSK by a DAC with 11.3GHz Analog Bandwidth," Optical Fiber Communication Conference/National Fiber Optic Engineers Conference 2013, OSA Technical Digest (online) (Optical Society of America, 2013), Anaheim, California, USA, Paper OTh1F.1, pp. 1-3, Mar. 2013.

\* cited by examiner

OPTICAL COMMUNICATION USING SUPER-NYQUIST SIGNALS

CROSS REFERENCE TO RELATED APPLICATIONS

This patent document claims the benefit of priority of U.S. Provisional Patent Application No. 61/870,749, filed on Aug. 27, 2013. The entire content of the before-mentioned patent application is incorporated by reference as part of the disclosure of this document.

BACKGROUND

This document relates to optical communication techniques, devices and systems.

With the advent of transmission of multimedia content such as video over the Internet and other communications networks, there is a demand for increased data rate capacity on communication networks. For example, in optical networks for backbones of communications networks, the traffic at the edges of the networks can aggregate to several gigabits of network traffic or higher, which can be difficult to handle by some existing optical network deployments. One way to meet increasing demand of optical communications network data capacity is to expand the optical fiber network infrastructure. However, laying down optical transmission media such as fiber links and associated fiber optical modules and subsystems requires significant capital expenditure and may not always be a suitable option due to the expenses involved, deployment limitations and certain regulatory issues.

SUMMARY

The techniques disclosed in this document enable generation of multi-channel modulated optical signals in which each channel comprises a super-Nyquist modulated signal and the channels are multiplexed together in the electrical domain, without the need to use an optical domain filter or a wavelength selective switch. In one advantageous aspect, the disclosed In one aspect, a disclosed optical communication method comprises, for a first optical channel from a plurality of optical channels having an equal baud rate, mapping data using a quadrature phase shift keying (QPSK) constellation into a modulated signal, upsampling the modulated signal, thereby generating an upsampled signal, filtering the upsampled signal using a digital super-Nyquist lowpass filter having a cutoff frequency that is less than or equal to half of the baud rate, thereby generating a bandlimited modulated digital signal, converting the bandlimited modulated digital signal into a first optical analog signal and optically multiplexing the first optical analog signal of the first optical channel with a second optical analog signal of a second optical channel from the plurality of optical channels to generate an optical output signal.

In another aspect, an optical communication system comprising an optical signal transmission apparatus and an optical signal receiver apparatus is disclosed. The optical signal transmission apparatus, for a first optical channel from a plurality of optical channels having an equal baud rate, maps data using a quadrature phase shift keying (QPSK) constellation into a modulated signal, upsamples the modulated signal, filters the upsampled signal using a digital super-Nyquist lowpass filter having a cutoff frequency that is less than or equal to half of the baud rate, thereby generating a bandlimited modulated digital signal, converts the bandlimited modulated digital signal into a first optical analog signal and optically multiplexes the first optical analog signal of the first optical channel with a second optical analog signal of a second optical channel from the plurality of optical channels to generate a multi-channel optical signal carrying data. The an optical signal receiver receives the multi-channel optical signal and recovers the data using a 9-Quadrature Modulated (9-QAM) multi-modulus blind equalization (MMBE) algorithm with maximum likelihood sequence detection (MLSD).

These and other aspects, and their implementations and variations are set forth in the drawings, the description and the claims.

BRIEF DESCRIPTION OF THE DRAWINGS

FIG. 13 FIG. 1 shows (a) example Quadrature Duo-Binary (QDB) spectrum shaped Polarization Modulated QPSK (PM-QPSK) by WSS or waveshaper for one pol.; (b) Constellation of PM-QPSK signal before and after QDB spectrum shaping.

Like reference symbols in the various drawings indicate like elements.

DETAILED DESCRIPTION

Figure 1A:
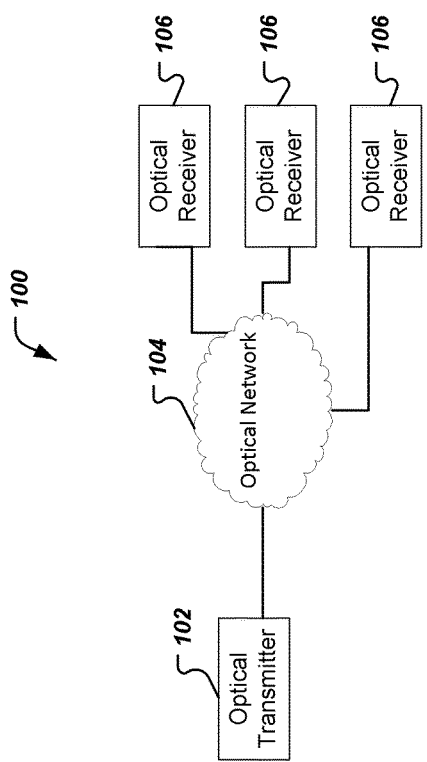
FIG. 1A depicts an architectural block diagram of an optical communication system.

The techniques disclosed in this document enable generation of optical WDM channels with high spectrum efficiency based on lowpass digital super-Nyquist filtering in the electrical domain in optical communication devices or systems.

In the description below, several embodiments have been discussed with specific references to modulation and other physical layer parameter values. However, the general applicability of the principles discussed will be appreciated by one of skill in the art.

With the development of high speed digital-to-analog converter (DAC), Nyquist wavelength-division-multiplexing (N-WDM) super-channels with much higher spectrum efficiency (SE) based coherent detection and digital signal processing (DSP) has been attracting a great deal of interest in recent years for the transmission of 100 G and beyond. In a typical optical communication implementation, a Nyquist pulse is digitally generated to achieve the Nyquist limit of SE, which enables the channel spacing approaching equal to the symbol rate with negligible crosstalk between adjacent channels and intersymbol interference (ISI) between adjacent symbols within the same channel. However, when considering the forward error correction (FEC) overhead, the transmission of high bandwidth channels, e.g., 100 G channels on existing optical line systems based on a 25 GHz channel spacing ITU grid, presents a difficult challenge due to the limited optical bandwidth available for each channel. The excess bandwidth of signal typically causes severe crosstalk. For example, in a signal modulation of 112-Gb/s Nyquist PDM-QPSK for polarization-division multiplexed (PDM) quaternary phase shift keying. (QPSK), the channel spacing should be larger than 28-GHz, which exceeds the ITU 25 GHz-grid limit. Therefore, the spectral efficiency of Nyquist polarization division multiplexed quadrature phase shift keying (PDM-QPSK) is less than 4 bits/s/Hz in a conventional DAC-based Nyquist signals.

On the other hand, the choice of channel spacing is a trade-off between intra-channel and inter-channel impairments, such as inter-symbol interference (ISI) and inter-channel crosstalk. By using algorithms based on multi-symbol detection to equalize the ISI impairment, a transmitter can transmit a super-Nyquist signal, of which the channel spacing can be smaller than the symbol rate without a significant penalty. For example, in some embodiments, super-Nyquist Wavelength Division Multiplexing (SN-WDM) can be achieved by using a wavelength selective switch (WSS) for optical filtering. The WSS may be used in each channel at a fixed wavelength for spectrum shaping. This WSS optical filtering in each channel can be combined with advanced digital signal processing algorithms based on the multi-modulus equalization (MMEQ) and 1-bit maximum likelihood sequence estimation (MLSE) to handle the enhanced crosstalk and ISI impairments.

In the embodiments disclosed in the present document, the spectrum shaping is achieved by using digital filters in DAC without using WSS optical filters for different channels. This spectrum shaping in the digital domain simplifies the optical hardware design and can be implemented to achieve various advantages, especially for multi-channels optical systems. Based on the disclosed spectrum shaping in the digital domain, WDM channels can be easily multiplexed by using optical couplers (OC). In some embodiments, a super-Nyquist wavelength-division-multiplexing (WDM) signal generation scheme based on digital super-Nyquist shaping technology without using optical filtering can be implemented. The super-Nyquist signal with high spectrum efficiency is generated directly by the digital-to-analog convertor (DAC) within limed bandwidth. The spectrum of generated super-Nyquist 9-QAM signal is further compressed in comparison with regular Nyquist QPSK signal. Super-Nyquist WDM channels multiplexing can be achieved using only optical couplers, without using any optical filtering. In some embodiments, the presently disclosed techniques can be used to generate and transmit 10 channels 32-GBaud (128-Gb/s) polarization division multiplexing 9-QAM signals on 25-GHz grid over 2975-km at a net SE of 4-b/s/Hz (after excluding the 20% soft-decision FEC overhead).

FIG. 1A is a block diagram for an example of an optical communication system 100 where the subject technology of this document can be implemented. An optical transmitter 102 transmits optical signals through an optical network 104 to one or more optical transceivers 106. The transmitted optical signals may go through intermediate optical equipment such as amplifiers, repeaters, switch, etc., which are not shown in FIG. 1A for clarity.

Figure 1B:
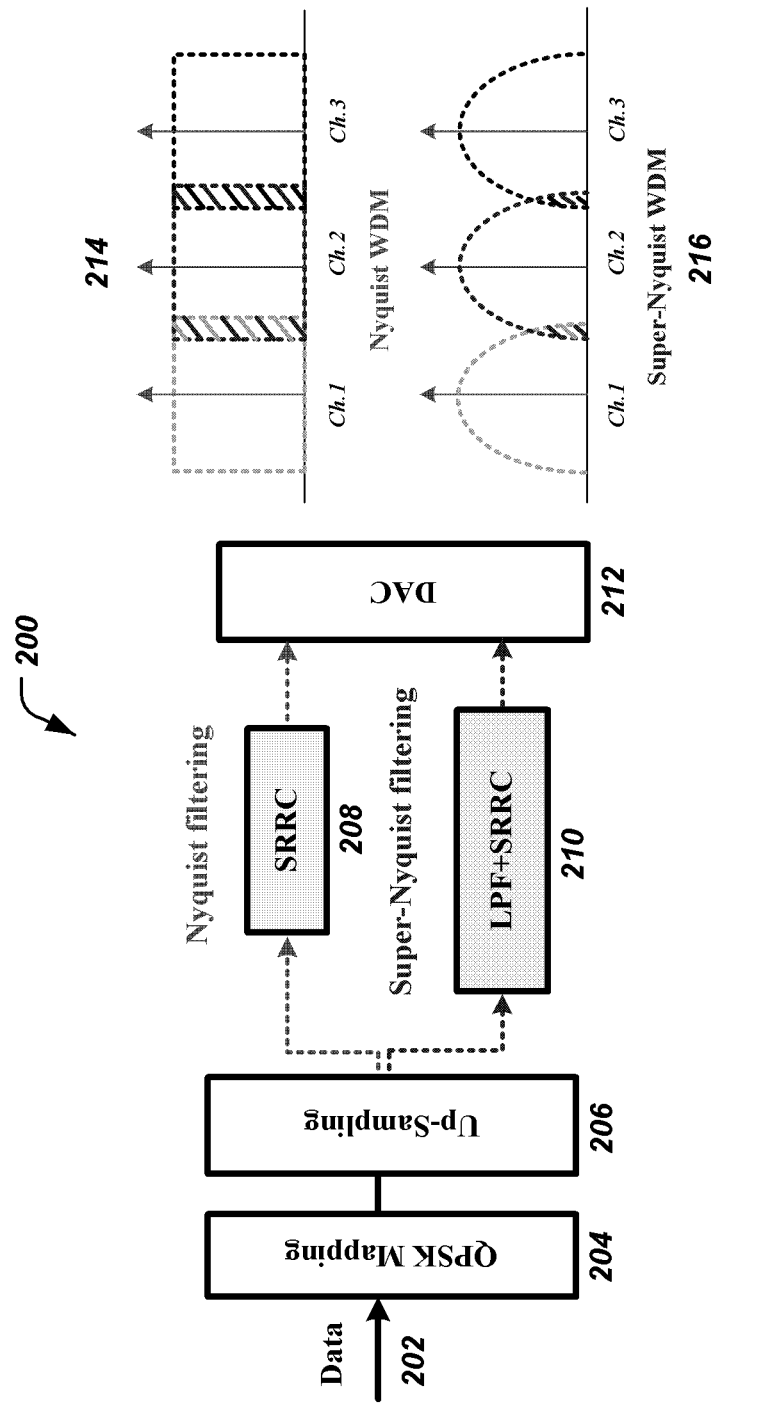
FIG. 1B depicts Digital to Analog Conversion (DAC) based Nyquist and super-Nyquist signal generation and the crosstalk impairments in super-Nyquist WDM (SN-WDM).

FIG. 1B is a block diagram for an example of a digital to analog conversion (DAC)-based super-Nyquist signal generation architecture 200 in comparison with a conventional Nyquist signal scheme. Data 202 is modulated using Quadrature Phase Shift Keying (QPSK) mapping in a QPSK mapper 204. The QPSK mapped data is upsampled using an upsampler 206. For regular Nyquist filtering, following the upper branch of FIG. 1B, only a square root raised cosine (SRRC) filter 208 is used for Nyquist pulse generation. However, when the channel spacing is less than the baud rate, after processing through the DAC 212, the excess bandwidth causes severe crosstalk. This is depicted by overlapping shaded region between channels 1, 2 and 3 in the spectrum 214 of the output of DAC 212.

In order to realize the super-Nyquist transmission, an additional low pass filters (LPF) is added in the electrical domain in the LPF+SRRC 210, prior to the DAC 212, for super-Nyquist pulse generation. Due to the additional low-pass filtering, the signal spectrum 216 is further suppressed to reduce the channel crosstalk. In some embodiments, the low pass filter can be realized by the quadrature duobinary (QDB) delay and add filter, of which the transfer function in z-transform is given by:

$$H_{QDB}(z)=1+z^{-1} \qquad \text{Eq. (1)}$$

The averaging filter of Eq. (1) (with a scale factor of ½) can be implemented by a two-tap FIR. This digital filtering in the electrical domain provides good performance and turns the QPSK into a signal whose constellation is similar to a 9-QAM signal. The net resulting super-Nyquist digital filter 210 in time domain by cascading the QDB and SRRC filters is a convolution of the two filters:

$$h_{SN}(t)=h_{QDB}(t) \otimes h_{srrc}(t) \qquad \text{Eq. (2)}$$

The $h_{ssrc}(t)$ is the time domain impulse response of SRRC filter. The term $h_{QDB}(t)$ represents the impulse response of QDB filter $H_{QDB}$ described in Eq. (1).

Figure 2:
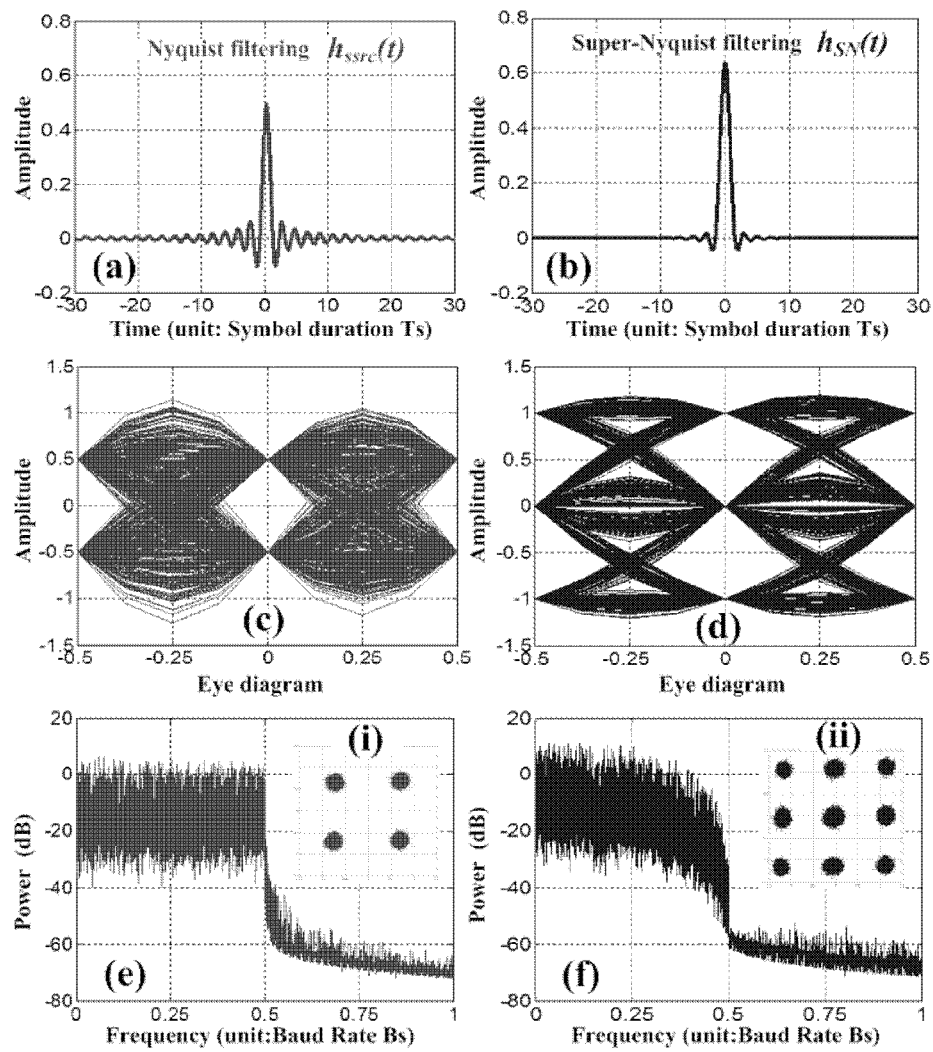
FIG. 2 illustrates the impulse response of (a) the Nyquist filter, (b) the super-Nyquist filter; the eye diagrams of the generated (c) Nyquist QPSK 2-level baseband signal and (d) the super-Nyquist 9-QAM 3-level baseband signal; The electrical power spectrum of the generated (e) Nyquist QPSK signal and (f) super-Nyquist 9-QAM signal.

FIGS. 2(a) and 2(b) show examples of time domain impulse response of the regular Nyquist filter based on SRRC and the super-Nyquist filter based on cascading QDB and SRRC filters, respectively. As illustrated, the roll-off fact of SRRC is set at 0. Less oscillations and fast convergence can be observed for the super-Nyquist digital filter. FIGS. 2(c) and 2(d) show eye diagrams of the generated Nyquist quadrature phase shift keyed (QPSK) 2-level baseband signal and the super-Nyquist 9-QAM 3-level baseband signal, respectively. The 3-level signal depicted in FIG. 2(d) is the result of QDB filter, which turns the QPSK signal to a 9-QAM signal. The electrical domain power spectrums of Nyquist QPSK and super-Nyquist 9-QAM signals are shown in FIGS. 2(e) and (f), respectively. The power spectrum of super-Nyquist signal is significantly suppressed near the transition band (near 0.5 Bs) compared with Nyquist signal, and the spectral side lobes are also more suppressed. The 3-dB bandwidth of the super-Nyquist filter is less than 0.5 Bs (signal baud rate). Insets (i) and (ii) if FIGS. 2(e) and 2(f) show the constellations of Nyquist QPSK and super-Nyquist 9-QAM signal, respectively.

Figure 3A:
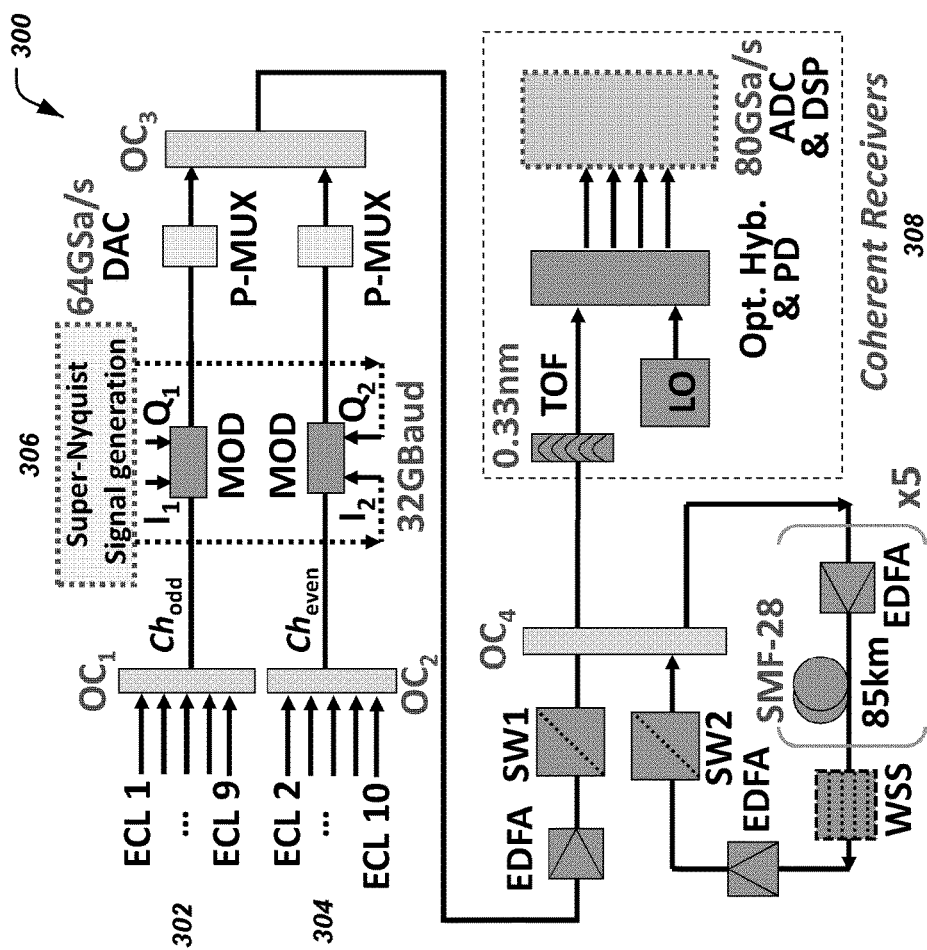
FIG. 3A depicts an experimental setup for 10×128 Gb/s super-Nyquist signal generation, transmission and receiving. (MOD: modulator; OC: optical coupler; P-MUX: polarization multiplexing; WSS: wavelength-selective switch; TOF: tunable optical filter)

FIG. 3A depicts an example of an optical communication system 300 performing 10×128 Gb/s super-Nyquist signal generation, transmission and coherent detection on a 25 GHz WDM grid. Ten tunable external cavity lasers (ECLs) $ECL_1$ to $ECL_{10}$ to generate the 10 channels groups (comprising odd/even channel groups 302, 304) in the system 300. In some embodiments, a linewidth of less than 100 kHz, the output power of 14.5 dBm and carrier-spacing of 25-GHz from 1548.88~1550.70 nm may be used.

The odd and even channels (302 and 304 respectively) can be implemented with two sets of polarization-maintaining optical couplers (PM-OCs) that are placed in the optical paths upstream to optical modulators such as independent in-phase and quadrature (I/Q) modulation devices (MODs). The super-Nyquist signals are generated (306) by a 64 GSa/s DAC, in which the in-phase and quadrature data is generated by operations described in FIG. 1B. The data after QPSK mapping is up-sampled by 2 times (e.g., as performed in the upsampler in FIG. 1B). The upsampled output QPSK-mapped data is then passed through the super-Nyquist filter as descripted in Eq. (2). The roll-off factor of SRRC filter may be set to zero. The 3-level baseband signal is of 32 GBaud, with a word length of $2^{15}-1$. The I/Q modulator in each I/Q MOD may be biased at the null point. The odd and even channels may be independently modulated by the four port outputs of the DAC.

Figure 3B:
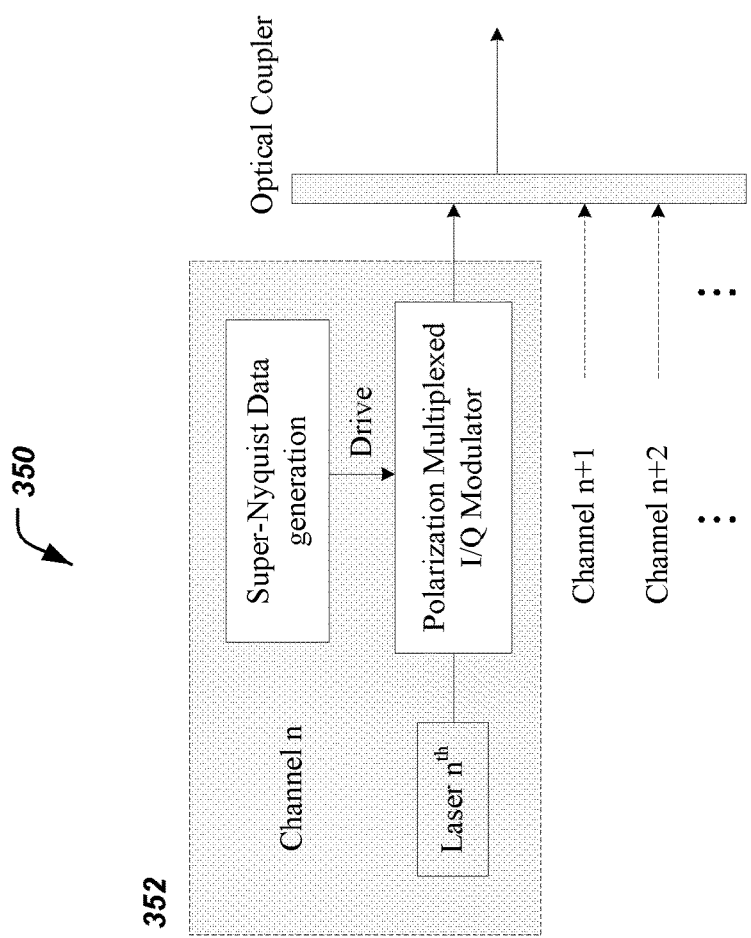
FIG. 3B depicts an example of a single channel where an optical carrier is I-Q modulated using data.

FIG. 3B is an example block diagram depiction 350 of how modulation can be performed in individual carrier path (i.e., for each carrier in the odd/even channel separation). The modulation mechanism 352 for a channel n can include a laser source input to a polarization multiplexed I/Q modulator, to which the output of the Super-Nyquist filtering scheme described in the present document is input. The modulated output of each channel is then multiplexed using an optical coupler (e.g. $OC_3$ in FIG. 3A).

The polarization multiplexing of the signal is realized by the polarization multiplexer (P-MUX), which comprises a PM-OC to halve the signal, an optical delay line to provide a delay of 150 symbols, and a polarization beam combiner (PBC) to recombine the signal. In contrast to prior art optical spectrum shaping schemes, the even and odd channels may be combined by a 2×1 optical coupler without using a WSS or an optical WDM interleaver. This optical multiplexing with a simple optical combiner simplifies the optical hardware and reduces the cost of the system.

At the receiver-side in system 300, the signal can be received by a coherent receiver and the modulated data bits may be recovered.

Figure 4:
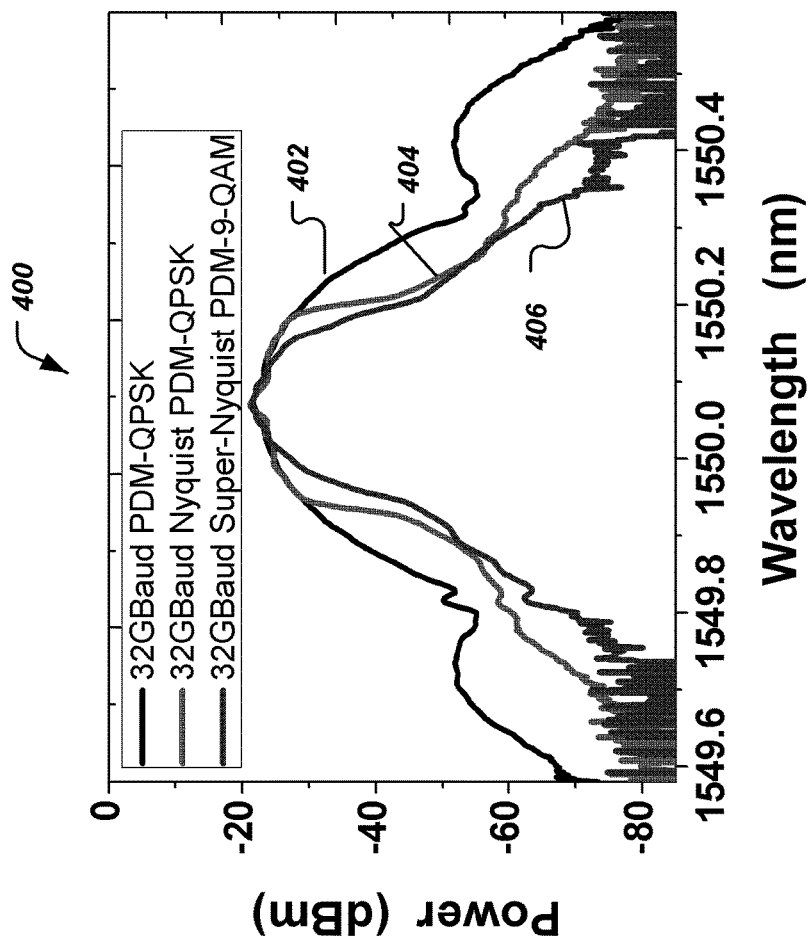
FIG. 4 depicts the optical spectrum of single channel 32-Gbaud PDM-QPSK, Nyquist PDM-QPSK and super-Nyquist PDM-9-QAM signal.

FIG. 4 shows an example of measured optical spectra 400 of generated single channel (SC) 32-GBaud PDM-QPSK (402), Nyquist PDM-QPSK (404) and super-Nyquist PDM-9-QAM signal (406). The PDM-QPSK signal 402, without any additional signal processing operation, occupies the largest bandwidth (broadest passband) and thus is least efficient in the spectrum efficiency. The bandwidth of Nyquist PDM-QPSK (404) is equal to the baud rate, which is 32-GHz and exceeds the 25-GHz carrier spacing. The super-Nyquist PDM-9-QAM signal (406) shows the narrowest bandwidth and thus exhibits the best spectrum efficiency, compared with other two types of signals. The 3-dB bandwidth is less than 0.5 baud rate.

As depicted in FIG. 3A, the generated 10×128-Gb/s, 25 GHz-grid channel signals may be launched into a transmission network, e.g., a transmission network with 5 spans of 85-km conventional SMF-28 with average loss of 18.5 dB and chromatic dispersion (CD) of 17 ps/km/nm, loop switches (SWs), optical coupler (OC), and Erbium-doped fiber amplifier (EDFA)-only amplification without optical dispersion compensation. The noise figure of EDFA is typically about 5.5-dB. One WSS may be placed in the loop, programmed to work as an optical band-pass filter to suppress the ASE (Amplitude Spontaneous Emission) noise.

Figure 5:
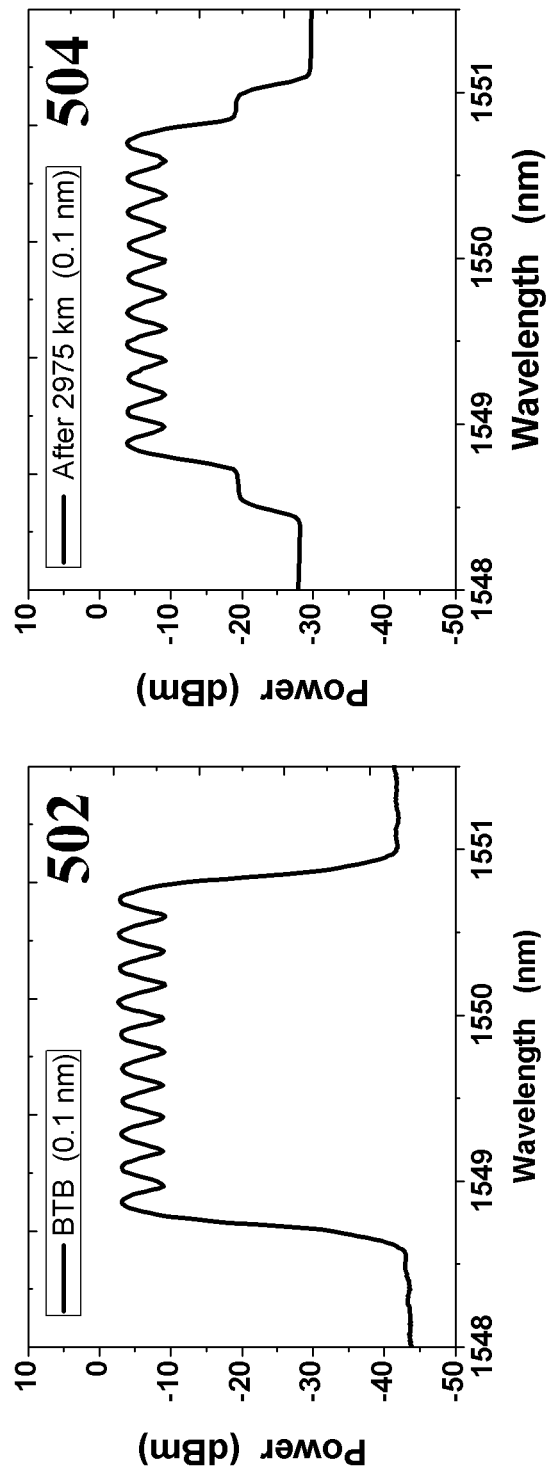
FIG. 5 depicts the optical spectrum of 10 channels 32 GBaud SN-WDM signal in 25 GHz grid: (a) back to back; (b) after 2975-km fiber (0.1 nm resolution).

FIG. 5 shows the optical spectrum of the 10-channel WDM signals before (502) and after (504) 2975-km SMF (single mode fiber) transmission. The raised power in the sidebands, due to the ASE noise can be seen in the output spectrum 504.

At the receiver 308, one tunable optical filter (TOF) with 3-dB bandwidth of 0.33 nm may be employed to choose the measured channel. Polarization and phase diversity coherent homodyne detection may be employed at the receiver. In some embodiments, the linewidth of ECL at the transmitter and local oscillator (LO) at the receiver can be both around 100 kHz. In an example setup, the analog-to-digital conversion (ADC) can be realized in the digital oscilloscope with the sample rate of 80 GSa/s and 30-GHz bandwidth. The data is first resampled to 64-GSa/s with CD compensation, and then processed by a multi-modulus blind equalization (MMBE) algorithm with maximum likelihood sequence detection (MLSD) described herein.

Figure 6:
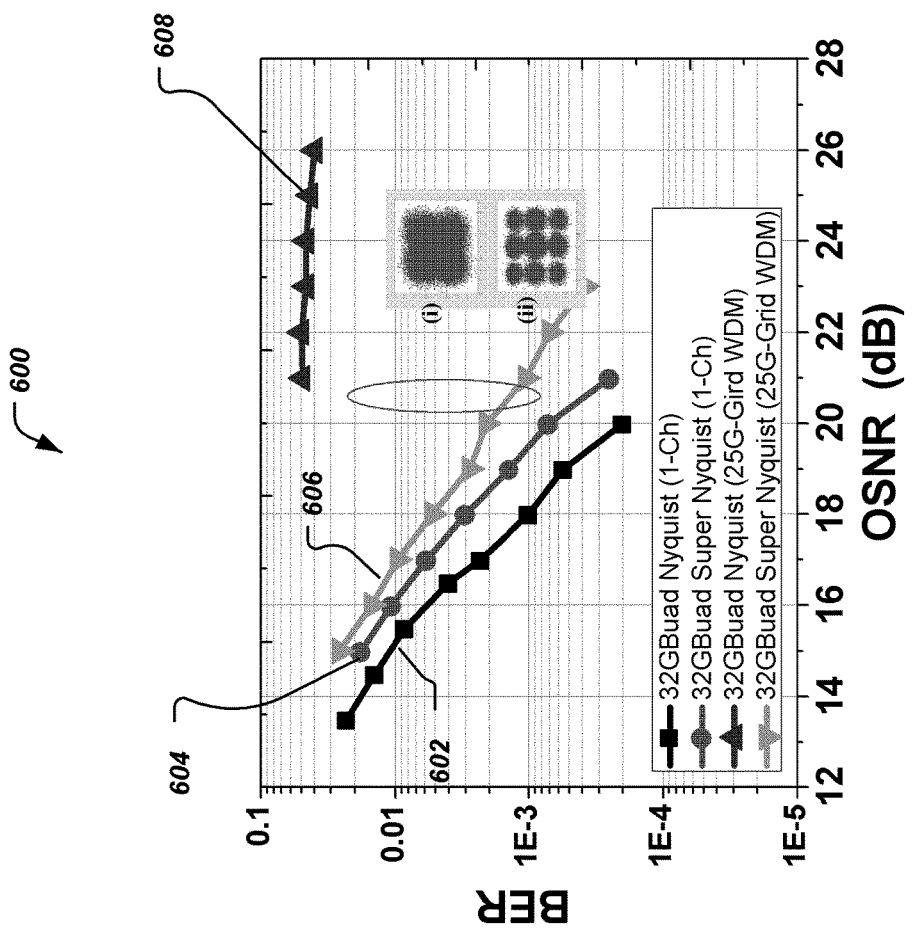
FIG. 6 depicts the back-to-back (BTB) bit error rate (BER) performance of 32-GBaud Nyquist and super-Nyquist signals versus OSNR in single channel case and 25-GHz grid WDM case. Insets (i) and (ii) are the constellations of Nyquist QPSK and super-Nyquist 9-QAM signal in WDM case with OSNR at 21-dB.

FIG. 6 is a graphical depiction 600 of the back-to-back (BTB) bit-error-ratio (BER) performance of 32-GBaud Nyquist PDM-QPSK and super-Nyquist PDM-9-QAM signals versus the optical signal to noise ratio (OSNR) in single channel case and 25-GHz grid WDM case (curves 602, 604, 606 and 608 respectively). In the single channel case (602, 604), the Nyquist signal (602) shows the best BER performance. Due to the narrow digital QDB filtering, the super-Nyquist 9-QAM signal shows about 1.5-dB OSNR penalty at BER of $1\times10^{-3}$ compared with SC Nyquist QPSK. However, for 25-GHz grid WDM case, the 32-GBaud Nyquist signal cannot be effectively recovered due to large crosstalk from adjacent channels. There is an error floor at $4\times10^{-2}$ for Nyquist QPSK signal even under large OSNR condition. Only about 1.5-dB OSNR penalty is observed for the 32 GBaud super-Nyquist signal in the 25-GHz grid WDM case (606) compared with SC case. Insets (i) and (ii) show the constellations of Nyquist QPSK and super-Nyquist 9-QAM signal in WDM case with OSNR at 21-dB, respectively. The constellation of Nyquist QPSK signal in WDM case is difficult to separate due to the large crosstalk. However, the super-Nyquist 9-QAM signal shows clearer constellation.

Therefore, only using optical couplers without any optical filters, a transmitter can generate and transmit the super-Nyquist signal with carrier spacing less than the baud rate.

Figure 7:
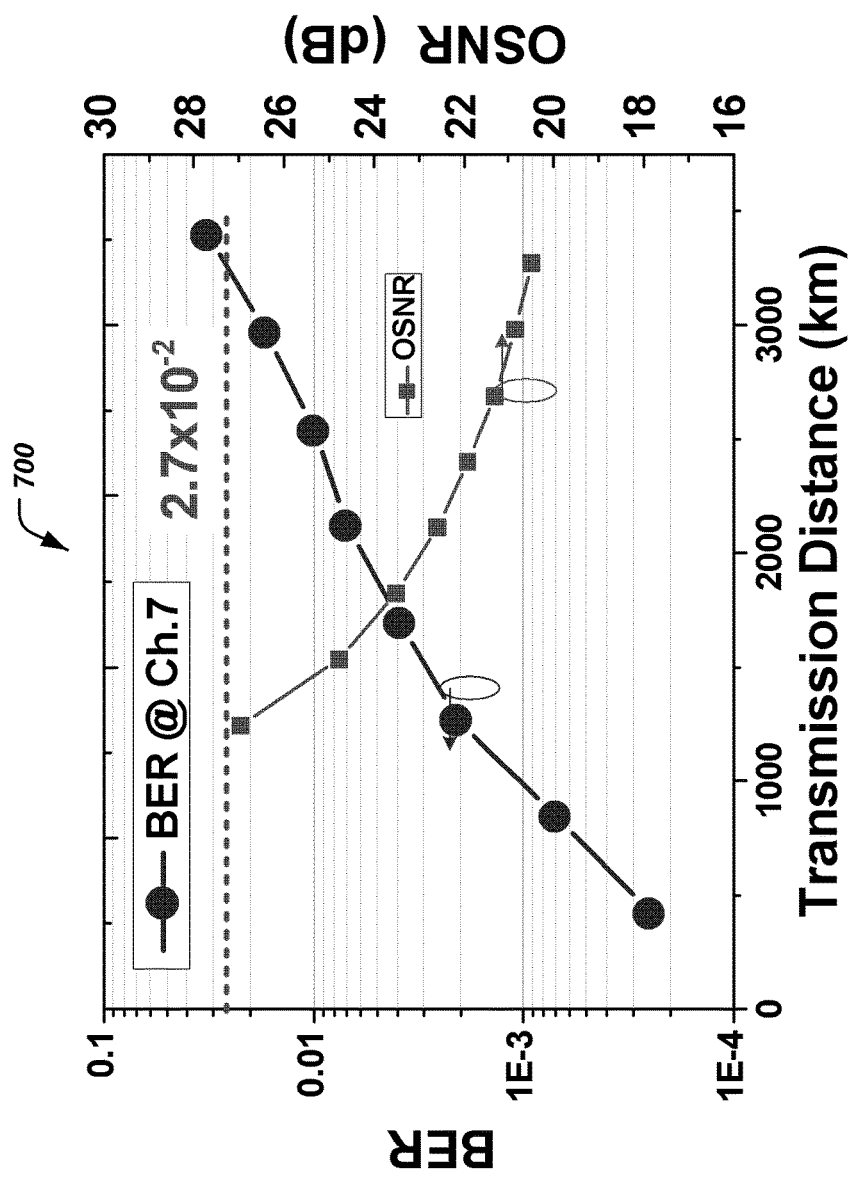
FIG. 7 depicts the measured BER and OSNR of Channel 7 versus the transmission distance.
Figure 8:
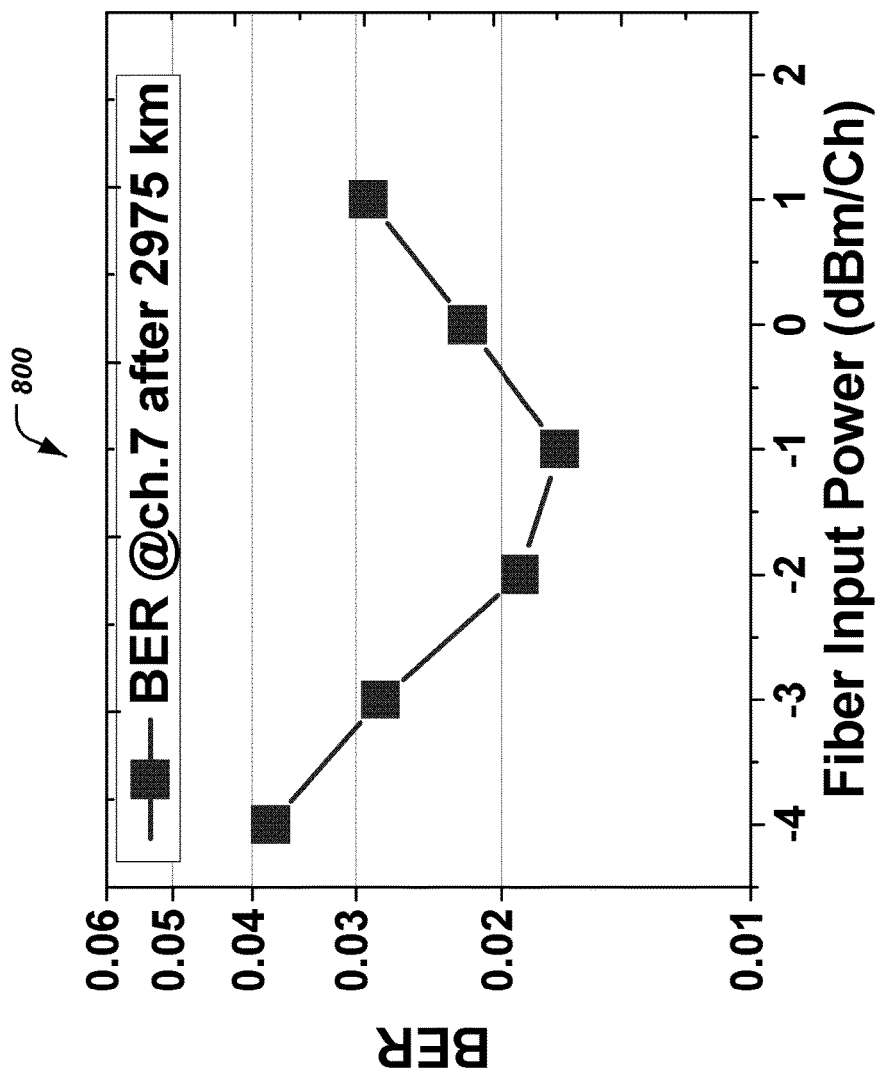
FIG. 8 provides an example of the BER performance of Channel 7 after 2975-km transmission versus the fiber input power per channel.
Figure 9:
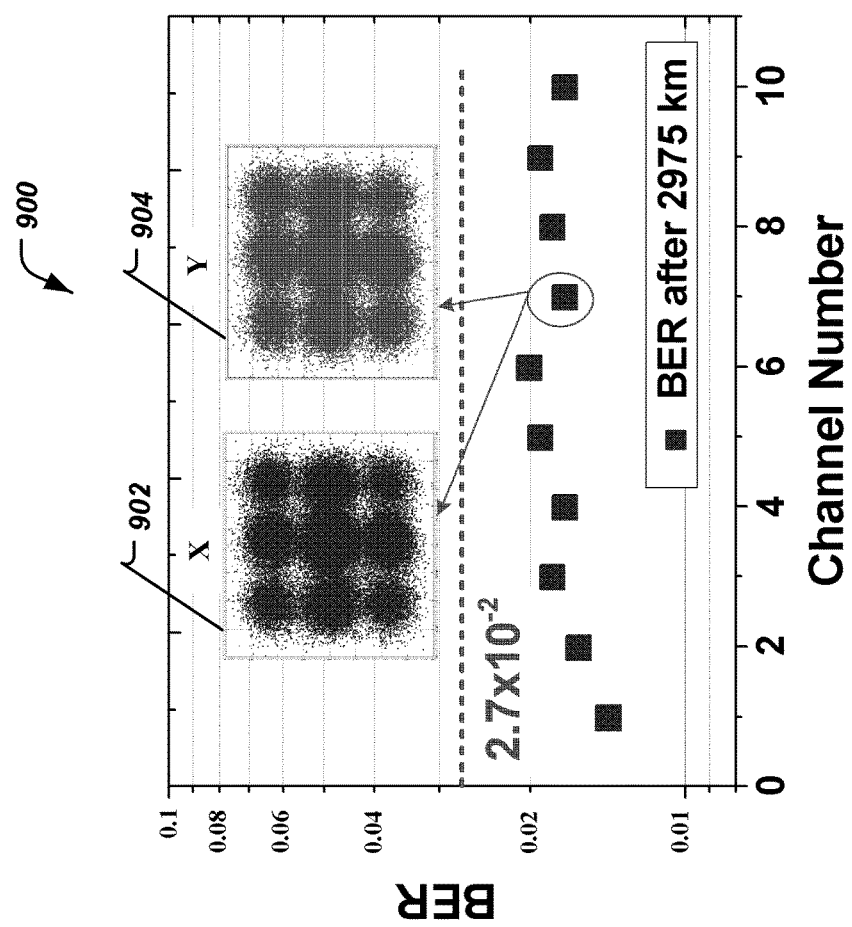
FIG. 9 shows the BER of all 10 channels after 2975-km transmission.

The transmission BER performances of the super-Nyquist WDM channels at 25 GHz-grid are shown in FIG. 7, FIG. 8 and FIG. 9.

In FIG. 7, graph 700 depicts the BER and OSNR of the Ch. 7 with transmission distance ranging from 425 to 3400-km. The measured BER of Ch. 7 after 2975-km transmission is $1.7 \times 10^{-2}$, with corresponding OSNR of 18-dB.

In FIG. 8, graph 800 depicts the BER performance of Ch. 7 after 2975-km fiber transmission versus the fiber input power per channel. It shows that optimal input power per channel is −1-dBm for WDM channels after 2975-km, corresponding to the total power of 9-dBm for 10 channels.

In FIG. 9, graph 900 depicts the measured BER of all ten 32 GBaud 128-Gb/s WDM channels on a 25-GHz grid after 2975-km transmission. After 2975-km transmission, the BER for all super-Nyquist-WDM channels are below the $2.7 \times 10^{-2}$ BER threshold for 20% soft-decision FEC using LDPC (low density parity code) encoding and layered decoding algorithm. The constellations of the received signal in X and Y polarization of channel 7 after transmission processed by the MMEQ are shown in FIG. 5 as insets. The super-Nyquist signal has a superior performance for long-haul Tb/s transmission.

Figure 10:
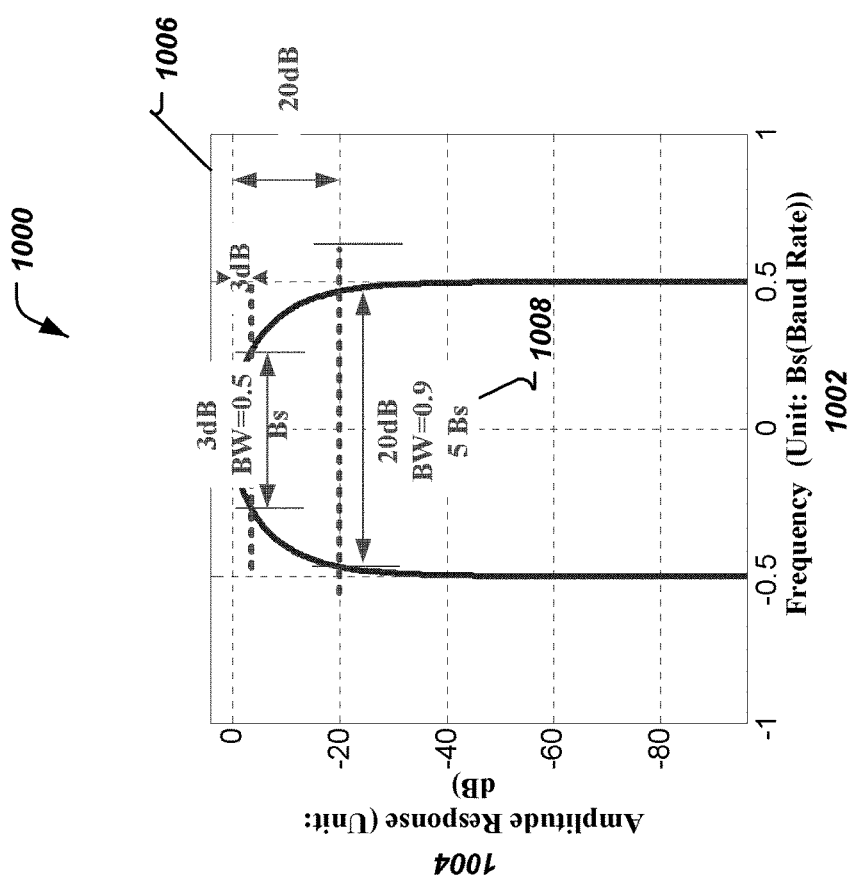
FIG. 10 depicts frequency response of a digital lowpass filter.

FIG. 10 shows examples of technical parameters of a filter amplitude frequency response (in dB) of the LPF in certain implementations. To achieve good performance, the filter should meet these conditions:

1. The cutoff frequency should be less than or equal to 0.25 Bs. (Bs is the signal baud rate);
2. The 3-dB bandwidth should be less than or equal to 0.5 Bs.
3. The 20-dB bandwidth should be less than or equal to 0.95 Bs.

General digital low pass filters, such as Gaussian, Bessel, Delay-and-add can be used in combination with Square root raised cosine (SRRC) filter to generate the super-Nyquist signals. Otherwise, BER penalty will be caused for the LPF with larger 3-dB or 20-dB bandwidth due to the crosstalk in Super-Nyquist WDM channels.

Figure 11:
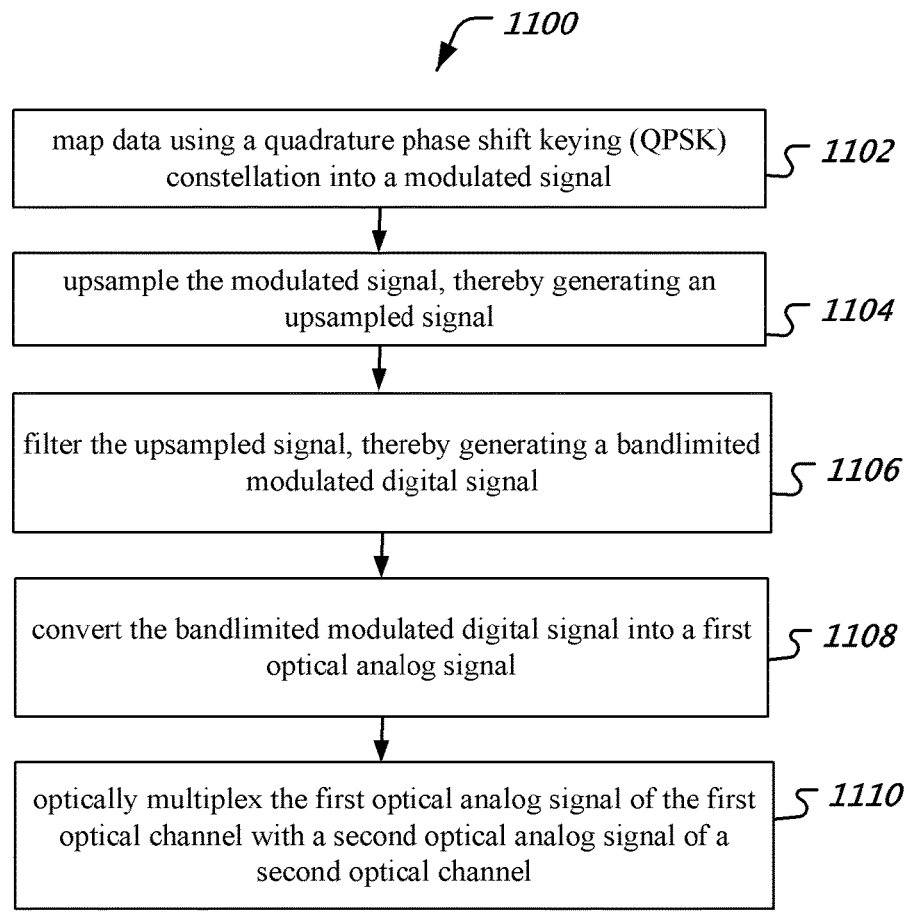
FIG. 11 is a flow chart representation of a process of optical communication.

FIG. 11 is a flowchart for an example of an optical communication method 1100 based on the disclosed lowpass digital super-Nyquist filtering in the electrical domain. The method 1100 may be implemented at a transmitter-side, e.g., at the transmitter 102. In some embodiments, for a first optical channel from a plurality of optical channels having an equal baud rate, the method 1100 may perform the following operations.

At 1102, the method 1100 maps data using a quadrature phase shift keying (QPSK) constellation into a modulated signal.

At 1104, the method 1100 upsamples the modulated signal, thereby generating an upsampled signal. In some embodiments, an upsampling factor of two may be use. Other upsampling factors, e.g., 4, 8, 16 etc., are also possible.

At 1106, the method 1100 filters the upsampled signal using a digital super-Nyquist lowpass filter having a cutoff frequency that is less than or equal to half of the baud rate, thereby generating a bandlimited modulated digital signal. In some embodiments, the digital super-Nyquist lowpass filter includes a cascade of a digital lowpass filter and a square root raised cosine (SRRC) filter, as previously disclosed with respect to FIG. 1B. In some embodiments, the digital lowpass filter includes an averaging filter, e.g., described in Eq. (1). As previously, described, the bandlimited modulated digital signal may be mathematically considered to include a 9-QAM modulated data.

In some implementations, the digital super-Nyquist lowpass filter may be characterized as follows. In the frequency domain, the passband attenuation may be 3 dB or better in the frequency range between zero (DC) and 0.25 of the baud date. The stopband attenuation may be in the range between 0.45 times the baud rate and 0.5 times the baud rate (which represents the Nyquist sampling frequency). In some embodiments, a filter with real valued coefficients may be used, thereby providing a frequency response whose amplitude is symmetric in the positive and negative frequency domains. In some embodiments, the filter may be a linear phase filter. In some embodiments, the attenuation in the stopband [0.45*baud_rate, 0.5*baud_rate] may be 20 dB or better. In some embodiments, the transition band may be centered at 0.25*baud_rate.

At 1108, the method 1100 converts the bandlimited modulated digital signal into a first optical analog signal. In some embodiments, polarization multiplexing may be used to further increase the throughput over a transmission medium. For example, as previously disclosed, the bandlimited modulated digital signal may be generated as separate in-phase and quadrature components that may be polarization multiplexed to generate a polarization multiplexed optical analog signal.

At 1110, the method 1100 optically multiplexes the first optical analog signal of the first optical channel with a second optical analog signal of a second optical channel from the plurality of optical channels to generate an optical output signal. As previously described, due to the super-Nyquist nature of the signals (i.e., digital sampling frequency is greater than twice the highest frequency content of the underlying signal), signals from different channels can be optically multiplexed without having to perform any filtering in the optical domain. Inexpensive equipment, such as an optical coupler, could be used to perform the optical multiplexing.

In some embodiments, the method 1100 may further transmit the optical analog signal over an optical transmission medium. The optical transmission medium may be, e.g., in the optical network 104.

Figure 12:
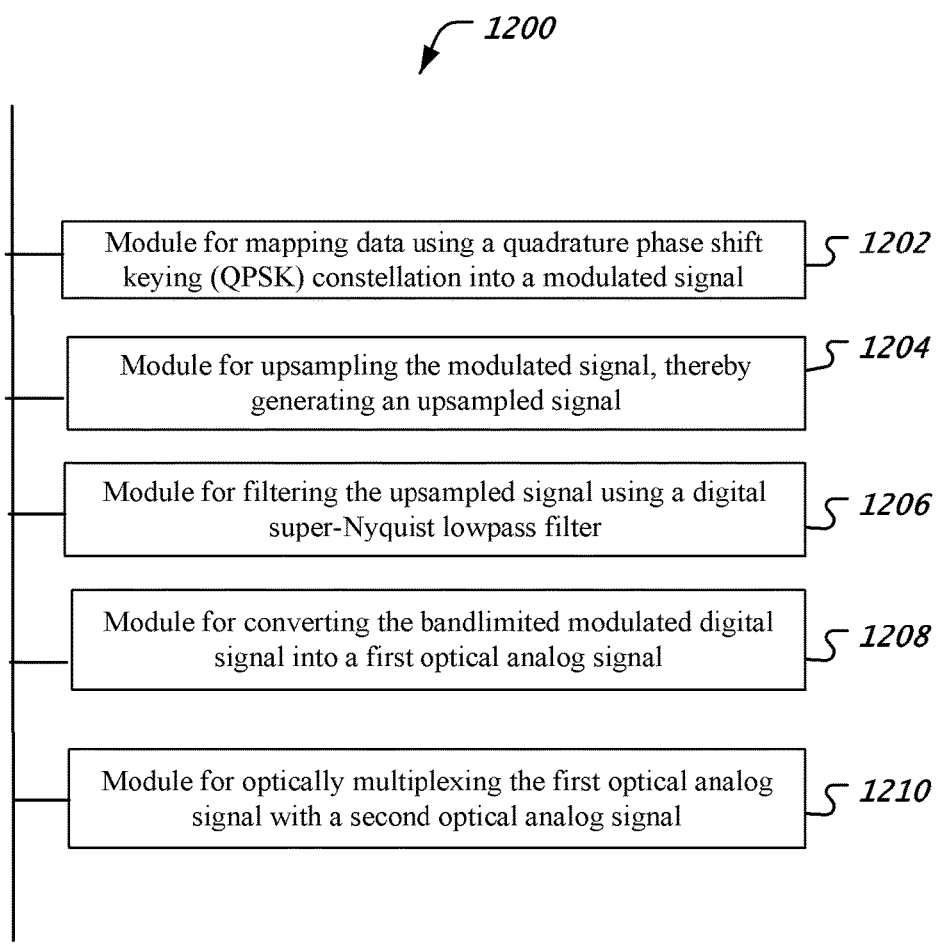
FIG. 12 is a block diagram representation of an apparatus for optical communications.

FIG. 12 is a block diagram for an example of an apparatus 1200 for optical communications based on the disclosed lowpass digital super-Nyquist filtering in the electrical domain. The apparatus 1200 includes a module 1202 that, for a first optical channel from a plurality of optical channels having an equal baud rate, maps data using a quadrature phase shift keying (QPSK) constellation into a modulated signal. The module 1204 is for upsampling the modulated signal, thereby generating an upsampled signal. The module 1206 is for filtering the upsampled signal using a digital super-Nyquist lowpass filter having a cutoff frequency that is less than or equal to half of the baud rate, thereby generating a bandlimited modulated digital signal. The module 1208 is for converting the bandlimited modulated digital signal into a first optical analog signal. The module 1210 is for optically multiplexing the first optical analog signal of the first optical channel with a second optical analog signal of a second optical channel from the plurality of optical channels to generate an optical output signal. The apparatus 1200 and modules 1202, 1204, 1206, 1208 and 1210 may further perform some of the techniques disclosed in the present document.

In some embodiments, an optical communication system may include an optical signal transmission apparatus and an optical signal receiver apparatus. The optical signal transmission apparatus, for a first optical channel from a plurality of optical channels having an equal baud rate, maps data using a quadrature phase shift keying (QPSK) constellation into a modulated signal, upsamples the modulated signal, filters the upsampled signal using a digital super-Nyquist lowpass filter having a cutoff frequency that is less than or equal to half of the baud rate, thereby generating a bandlimited modulated digital signal, converts the bandlimited modulated digital signal into a first optical analog signal and optically multiplexes the first optical analog signal of the first optical channel with a second optical analog signal of a second optical channel from the plurality of optical channels to generate a multi-channel optical signal carrying data. The an optical signal receiver receives the multi-channel optical signal and recovers the data using a 9-Quadrature Modulated (9-QAM) multi-modulus blind equalization (MMBE) algorithm with maximum likelihood sequence detection (MLSD).

One of ordinary skill in the optical communications art will appreciate that a super-Nyquist WDM signal generation scheme has been disclosed. In one aspect, the scheme is based on digital super-Nyquist shaping technology without using optical filtering such as a WSS. In some embodiments, the super-Nyquist signal with high spectrum efficiency is generated directly by a DAC within the channel bandwidth. In some embodiments, the spectrum of the generated super-Nyquist 9-QAM signal is further compressed compared with regular Nyquist QPSK signal.

In implementations, the disclosed lowpass digital super-Nyquist filtering in the electrical domain can be used to provide optical wavelength division multiplexing of super-Nyquist WDM channels in the optical domain, without using any optical filtering such as a WSS. Experimental results have also been provided, illustrating the generation and transmission 10 channels 32-GBaud (128-Gb/s) PDM-9-QAM signals within 25-GHz grid over 2975-km at a net SE of 4-b/s/Hz (after excluding the 20% soft-decision FEC overhead). Embodiments directed to wireless and wireline (e.g., copper wire or coaxial cable) transmission mediums are also possible using couplers (that do not perform optical lowpass filtering to achieve super Nyquist spectrum for transmitted signals) for respective communication media.

QDB Spectrum Shaped PM-QPSK Signal

Figure 13:
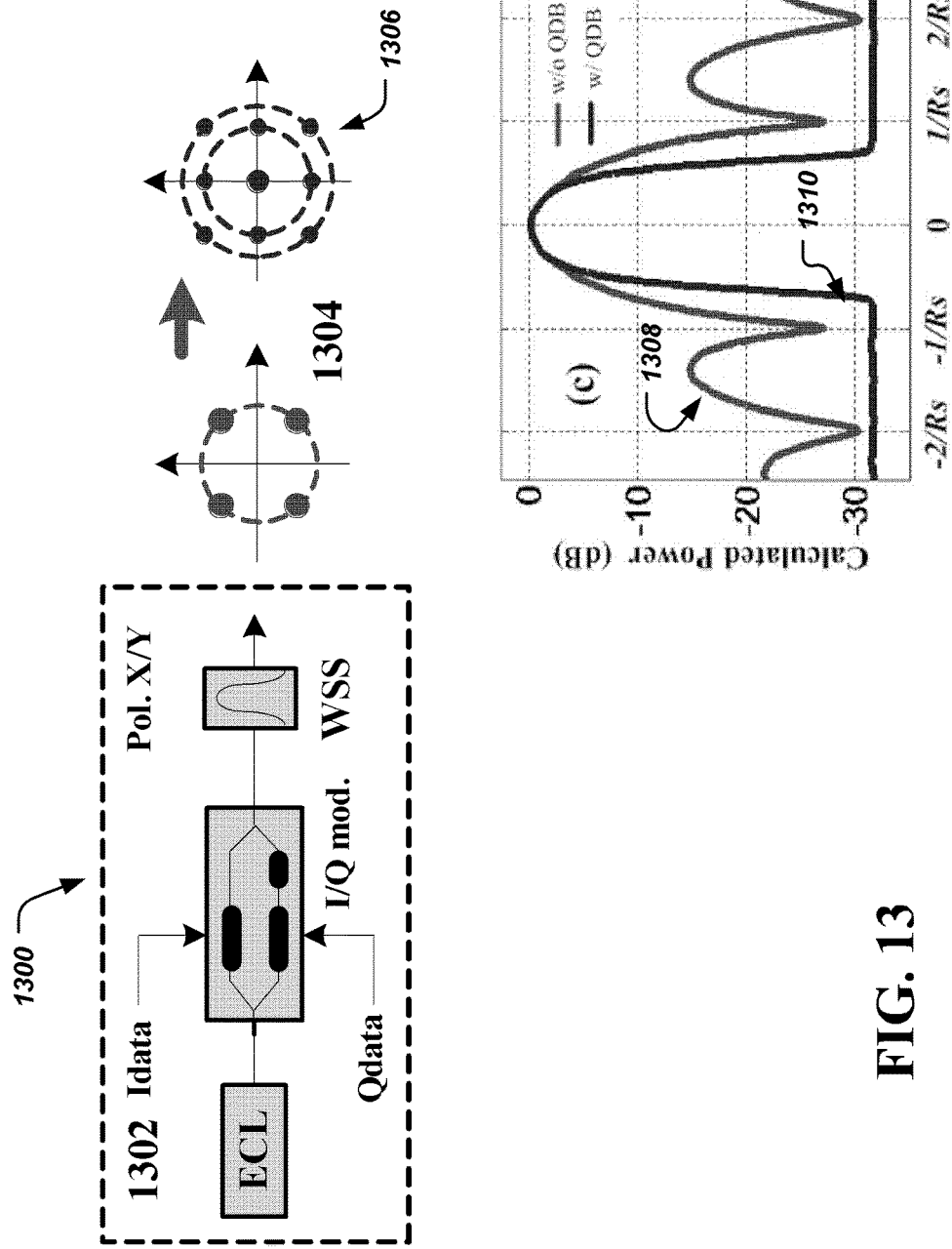

FIG. 13 shows the concept of quadrature duobinary (QDB) spectrum shaping for PM-QPSK signal. Generally, the spectral shaping can be performed by either two electrical low-pass filters on the two quadrature electrical signals or an optical bandpass filter after the optical QPSK modulation. Both schemes are with same performance and used in previous report systems. For PM-QPSK signals with symbol rate of Rs, we use a waveshaper or wavelength selective switch (WSS) with 3 dB pass bandwidth of Rs or less for spectral shaping as shown in 1302. The PM-QPSK signal constellations before and after QDB spectrum shaping are shown in 1304. It can be seen that after QDB spectrum shaping, the 4-point QPSK signal becomes a 9-point duobinary QPSK signal with zero point in constellation due to the filtering effect. The QDB shaped signal is significantly spectrum narrower compared with QPSK, and the spectral side lobes are also greatly suppressed. The 9 points of QDB QPSK signals are located on three circles with different radii. The narrower signal spectrum is obtained, as demonstrated in 1306. Here, the QDB spectrum shaping is operated by a 4th order Gaussian optical band pass filter with 3-dB bandwidth of Rs. The main spectral lobe of QDB shaped signal (1310) is significantly narrower compared with QPSK (1308), and the spectral side lobes are also greatly suppressed. These spectral features of QDB spectrum shaped signals have important implications on WDM crosstalk, tolerance to narrow optical filtering, and chromatic dispersion, which provides a practical means for achieving transmission the Nyquist limit of spectral efficiency for a given baud rate.

Algorithms and Example Results

Consider a QDB spectrum shaped PM-QPSK system where the received signal is sampled and processed in a Digital Signal Processor (DSP) after CD (chromatic dispersion) and possibly nonlinearity compensation, timing recovery. Chromatic dispersion and other nonlinear fiber transmission impairments can also significantly affect the system performance. They should be compensated first before the described DSP modulus. However, the CD compensation methods are universal and the same as the regular QPSK system, both frequency domain transfer function or time domain FIR can be used to compensate the CD. The description herein mainly focus on the different parts of the DSP for 9-point QDB spectrum shaped signal compared with the regular QPSK signal. Thus, the described embodiments are with respect to DSP performance under different spectrum shaping bandwidth, laser linewidth or frequency offset and OSNR which is implemented in B2B case.

Cascaded Multi-Modulus Algorithm for QDB PM-QPSK

Figure 14:
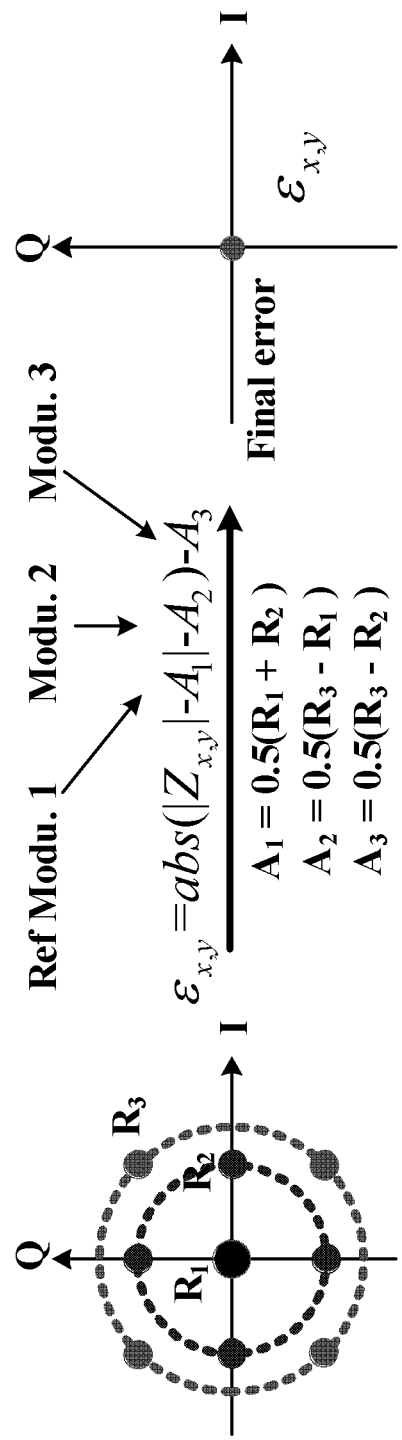
FIG. 14 illustrates CMMA for QDB spectrum shaped PDM-QPSK.

For QDB spectrum shaped PM-QPSK, classic CMA is not well compatible. This is because 9-point signal does not present constant symbol amplitude. It not only leads to extra noise after equalization, but also causes a problem with filter taps frequency response. Thus, the CMMA used in PM 8-QAM systems with good modulus decision performances for blind polarization de-multiplexing can be used. An example embodiment of CMMA for QDB spectrum shaped PDM-QPSK signals is shown in FIG. 14. It is also a four butterfly-configured adaptive digital equalizers. Here, $\varepsilon_{x,y}$ is the feedback signal error for filter tap updating. The corresponding filter tap (h coefficients) weight updating equalizations are given as follows:

$$h_{xx}(k) \to h_{xx}(k) + \mu \varepsilon_x(i) e_x(i) \hat{x}(i-k)$$

$$h_{xy}(k) \to h_{xy}(k) + \mu \varepsilon_x(i) e_x(i) \hat{y}(i-k)$$

$$h_{yx}(k) \to h_{yx}(k) + \mu \varepsilon_y(i) e_y(i) \hat{x}(i-k)$$

$$h_{yy}(k) \to h_{yy}(k) + \mu \varepsilon_y(i) e_y(i) \hat{y}(i-k) \quad \text{Eq. (3)}$$

and for QDB 9-point signal is given by $$e_{x,y}(i) = \text{sign}(||Z_{x,y}(i)| - A_1| - A_2) \cdot \text{sign}(|Z_{x,y}(i)| - A_1) \cdot \text{sign}(Z_{x,y}(i)) \quad \text{Eq. (4)}$$

Here, x and y and denote the complex conjugates of received signals x and y, respectively. Sign (x) is the sign function and is the convergence parameter. By introducing three reference circles A1, A2, A3, the final error can approach zero for ideal QDB signal as worked in 8 QAM signals. R1, R2 and R3 are the radius of the three modulus QDB PDM-QPSK signal and $Z_{x,y}$ is the output of equalizer. As a result, it is clear that the regular CMA error signal will not approach zero even for an ideal 9-point signal.

Joint-Polarization QPSK Partitioning FOE

In some embodiments, a well-known regular m-power algorithm can be also used for FOE for the 9-point QDB spectrum shaped signal with partitioning. On the other hand, for polarization multiplexed coherent system, the same transmitter and LO are used for the two polarizations signals. In this way, both polarizations signals are affected by the same frequency offset. To address this issue, in some embodiments, a joint-polarization QPSK partitioning algorithm for FOE.

Figure 15:
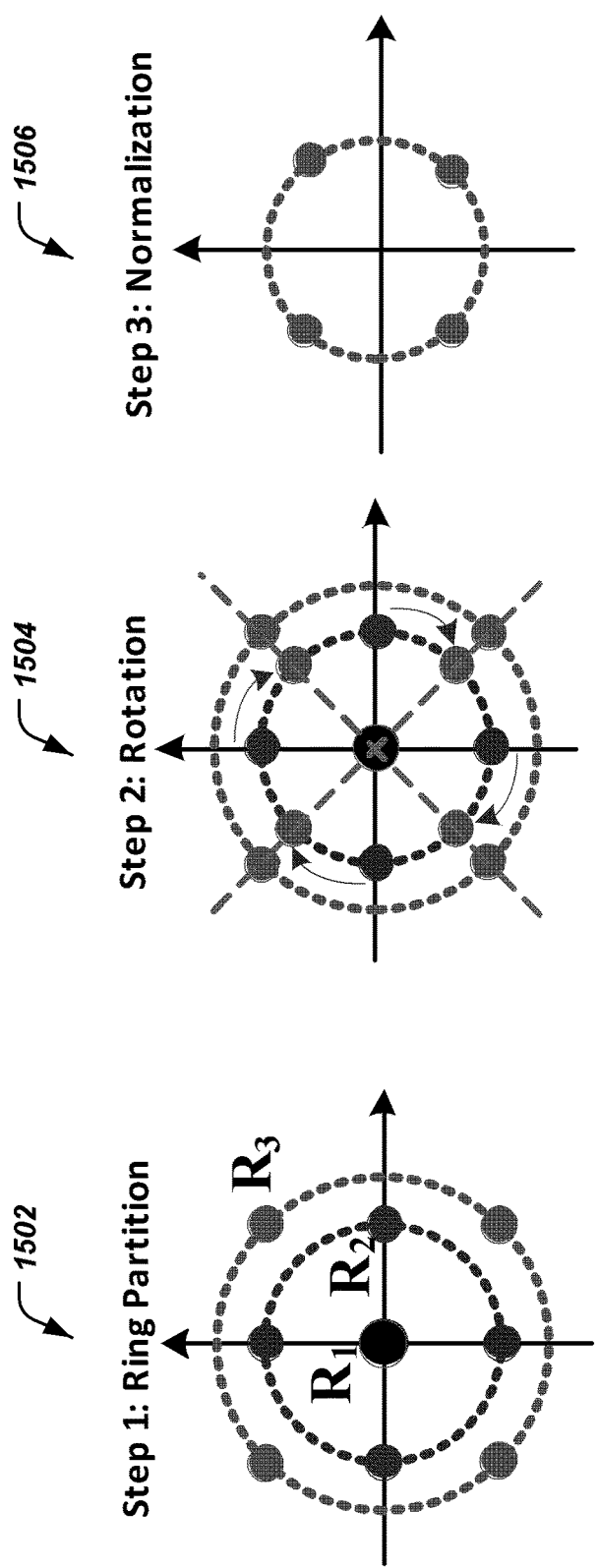
FIG. 15 illustrates QPSK partition and rotation.

FIG. 15 shows the principle of QPSK partition and rotation for the 9-point QDB spectrum shaped signal. The processing consists of 3 steps. Since the amplitude of R1 symbols is zero, the frequency offset and carrier phase noise have no impact on the R1 symbols (1502). Thus, embodiments can only use the R2 and R3 symbols for frequency offset estimation and phase recovery. The input symbols are first ring partitioned by their amplitudes with three values. Then, only the middle ring symbols in R2 are constellation rotated with $-\pi/4$ (1504). Finally, the symbols in the middle and outside two rings R2 and R3 are normalized (1506) according to their amplitudes. In this way, the middle and outside two rings combined to one ring with QPSK 4 point constellation.

Figure 16:
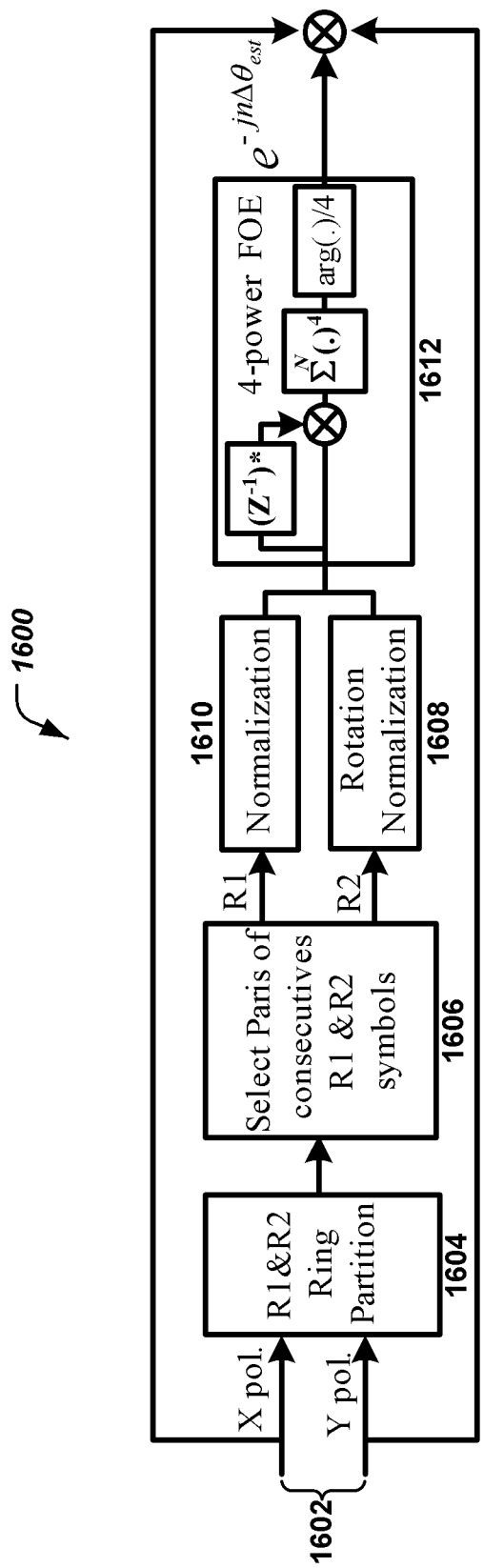
FIG. 16 is a block diagram representation of joint-polarization QPSK partitioning FOE.

FIG. 16 shows a block diagram depiction of an example joint-polarization QPSK partitioning algorithm for FOE. After polarization demultiplexing by CMMA, the incoming X and Y pol. Symbols (1602) are first portioned into three groups with different circle radius (1604). Here, only pairs of consecutive R1 and R2 symbols are selected for estimation to reduce the complexity of the algorithm (1606). Then R2 symbols are first rotated with angle (1608) and then normalized. However, R1 symbols are only normalized (1610). After that, the two groups can combine together with a "QPSK" like constellation (1612). In this way, the 4 power frequency estimation for QPSK can operate now. For N pairs of R1 and R2 symbols, the phase angle estimation caused by frequency offset is $$\Delta\theta_{est} = 2\pi\Delta f_{est}T_s = \frac{1}{4}\arg\sum_1^N (S_{k+1} \cdot S_k^*)^4 \qquad \text{Eq. (5)}$$

here $S_k$ is the combined normalized symbols of R1 and R2 groups, $T_s$ is the symbol duration and $\Delta f_{est}$ is the estimated frequency offset. Then the frequency offset can be compensated by $e^{-jn\Delta\theta_{est}}$ for the nth received symbol in both polarizations. The frequency offset $\Delta f_{est}$ can be estimated within $[-1/(8T_s), +1/(8T_s)]$ for proposed 4th power operation.

Two Stages QPSK Partitioning/ML Carrier Phase Recovery

As analyzed above, the QPSK partitioning scheme can be also used in the CPR for QDB spectrum shaped signals. On the other hand, maximum likelihood algorithm shows good improvement and low complexity for 16 QAM phase estimation. In this way, a two stage phase recovery for the 9-point QDB spectrum shaped signal based on QPSK Partition/ML can be performed in some embodiments (see FIG. 17).

Figure 17:
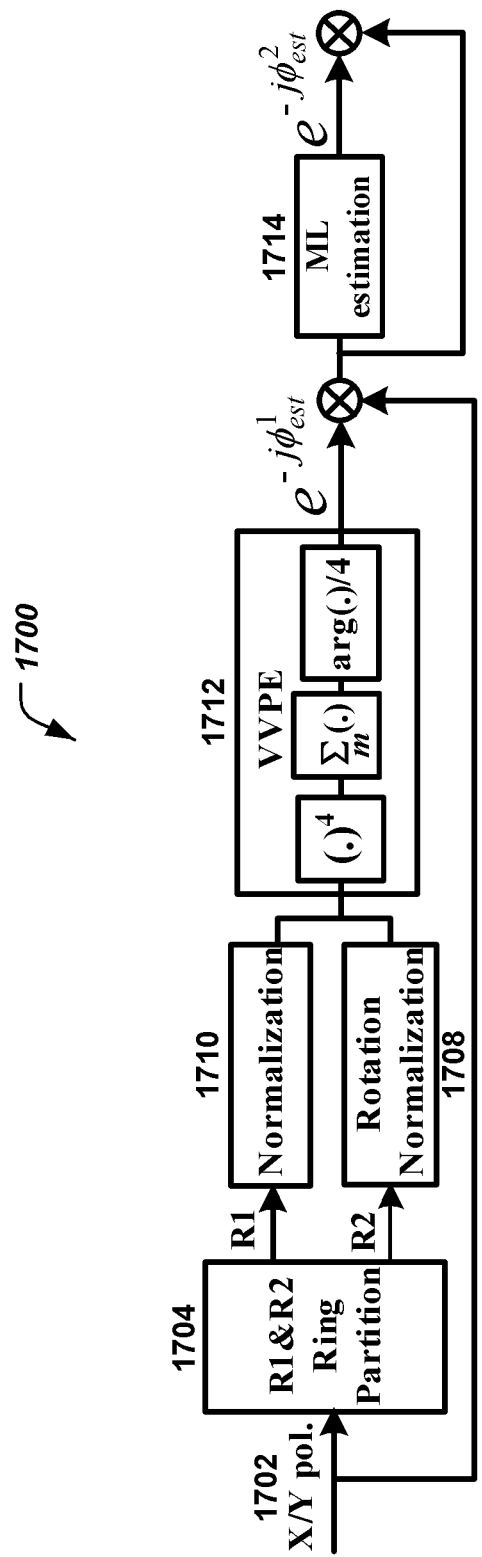
FIG. 17 is a block diagram representation of two stages phase estimation based on QPSK partitioning/ML.

In FIG. 17, an example two-phase recovery implementation 1700 based on QPSK partition and ML is depicted. The principle of R2 and R3 ring partition, rotation and normalization is similar as shown in FIG. 16, that is, the operation of 1702, 1704, 1708 and 1710 are similar to 1602, 1604, 1608 and 1610 respectively. In scheme 1700, only R2 and R3 symbols are used for phase recovery. In practice, the partition steps for FOE and phase recovery can become one. After that, the symbols in R2 are first rotated with angle and then normalized, while R1 symbols are only normalized and then combined with R2 symbols. Here, all the combined symbols can be used in groups and is the number of symbols in each group. In this way, the first stage phase can be eliminated by Viterbi and Viterbi phase estimation (VVPE) as $$\phi_{est}^1 = \left(\sum_m S_k^4\right)/4. \qquad \text{Eq. (6)}$$

The second stage of phase estimation $\phi_{est}^2$ based on ML as $$h = \sum_m S_k \cdot D_k^* \qquad \text{Eq. (7)}$$

$$\phi_{est}^2 = \tan^{-1}(\text{Im}[h]/\text{Re}[h])$$

Here, $D_k$ is the decision of $S_k$ after the first stage phase recovery. The second stage phase recovery is implemented before final output.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. An optical communication method, comprising:
   mapping data, for a first optical channel, using a quadrature phase shift keying (QPSK) constellation into a modulated signal, wherein the first optical channel is from a plurality of optical channels having an equal baud rate;
   upsampling, for the first optical channel, the modulated signal, thereby generating an upsampled signal;
   filtering, for the first optical channel, the upsampled signal using a digital super-Nyquist lowpass filter having a cutoff frequency that is less than or equal to half of the baud rate, thereby generating a bandlimited modulated digital signal, wherein the digital super-Nyquist lowpass filter comprises a cascade of a digital lowpass filter and a square root raised cosine (SRRC) filter, and wherein the digital lowpass filter is configured to reduce channel cross-talk among the plurality of optical channels; and
   converting, for the first optical channel, the bandlimited modulated digital signal into a first optical analog signal; and
   optically multiplexing the first optical analog signal of the first optical channel with a second optical analog signal of a second optical channel from the plurality of optical channels to generate an optical output signal having a channel spacing less than the baud rate of the first optical channel and the second optical channel.

2. The method of claim 1, wherein the digital lowpass filter is an averaging filter.

3. The method of claim 1, wherein the upsampling comprises upsampling by a factor of two.

4. The method of claim 1, wherein the bandlimited modulated digital signal comprises a 9-quadrature amplitude modulated (9-QAM) representation of the data.

5. The method of claim 1, further comprising:
   transmitting the optical analog signal over an optical transmission medium.

6. The method of claim 1, wherein the bandlimited modulated digital signal comprises in-phase and quadrature components and wherein the converting comprises:
   polarization-multiplexing the in-phase and quadrature components such that the optical analog signal is a polarization-multiplexed optical signal.

7. The method of claim 1, wherein the digital super-Nyquist lowpass filter comprises a passband whose attenuation is less than or equal to 3 dB in a low frequency range comprising DC frequency to 0.25 of the baud rate and a stopband whose attenuation is greater than or equal to in a high frequency range between 0.45 of the baud rate and half the baud rate.

8. The method of claim 1, wherein a frequency response of the digital super-Nyquist lowpass filter attenuates by at least 20 dB at half of the baud rate.

9. The method of claim 1, wherein the optical multiplexing operation is performed without optical filtering.

10. The method of claim 9, wherein the optical multiplexing is performed using an optical coupler.

11. The method of claim 1, wherein the digital lowpass filter includes a quadrature duobinary (QDB) delay and add filter.

12. An optical communication apparatus, comprising:
    a mapper that maps, for a first optical channel, data using a quadrature phase shift keying (QPSK) constellation into a modulated signal, wherein the first optical channel is from a plurality of optical channels having an equal baud rate;
    an upsampler that upsamples, for the first optical channel, the modulated signal, thereby generating an upsampled signal;
    a digital super-Nyquist lowpass filter having a cutoff frequency that is less than or equal to half of the baud rate that filters, for the first optical channel, the upsampled signal, thereby generating a bandlimited modulated digital signal, wherein the digital super-Nyquist lowpass filter comprises a cascade of a digital lowpass filter and a square root raised cosine (SRRC)

filter, and wherein the digital lowpass filter is configured to reduce channel cross-talk among the plurality of optical channels; and digital to analog converter (DAC) that converts, for the first optical channel, the bandlimited modulated digital signal into a first optical analog signal; and a multiplexer that optically multiplexes the first optical analog signal of the first optical channel with a second optical analog signal of a second optical channel from the plurality of optical channels to generate an optical output signal having a channel spacing less than the baud rate of the first optical channel and the second optical channel.

13. The apparatus of claim 12, wherein the digital lowpass filter is an averaging filter.

14. The apparatus of claim 12, wherein the upsampler performs upsampling by a factor of two.

15. The apparatus of claim 12, wherein the bandlimited modulated digital signal comprises a 9 quadrature amplitude modulated (9-QAM) representation of the data.

16. The apparatus of claim 12, further comprising:
an optical transmitter that transmits the optical analog signal over the communication channel.

17. The apparatus of claim 12, wherein the bandlimited modulated digital signal comprises in-phase and quadrature components and wherein the converter comprises:
a polarization multiplexer that polarization-multiplexing the in-phase and quadrature components such that the optical analog signal is a polarization-multiplexed optical signal.

18. The apparatus of claim 12, wherein the digital super-Nyquist lowpass filter comprises a passband whose attenuation is less than or equal to 3 dB in a low frequency range comprising DC frequency to 0.25 of the baud rate and a stopband whose attenuation is greater than or equal to in a high frequency range between 0.45 of the baud rate and half the baud rate.

19. The apparatus of claim 12, wherein a frequency response of the digital super-Nyquist lowpass filter attenuates by at least 20 dB at half of the baud rate.

20. The apparatus of claim 12, wherein the multiplexer performs the optical multiplexing operation without optical filtering.

21. The apparatus of claim 20, wherein the multiplexer comprises an optical coupler that optical multiplexes the first optical analog signal and the second optical analog signal.

22. The apparatus of claim 12, wherein the digital lowpass filter includes a quadrature duobinary (QDB) delay and add filter.

23. An optical communication system, comprising:
an optical signal transmission apparatus that transmits a multi-channel optical signal carrying data; and
an optical signal receiver that receives the multi-channel optical signal and recovers the data using a 9-Quadrature Modulated (9-QAM) multi-modulus blind equalization (MMBE) algorithm with maximum likelihood sequence detection (MLSD);
wherein the optical signal transmission apparatus:
for a first optical channel from a plurality of optical channels having an equal baud rate:
maps data using a quadrature phase shift keying (QPSK) constellation into a modulated signal;
upsamples the modulated signal, thereby generating an upsampled signal;
filters the upsampled signal using a digital super-Nyquist lowpass filter having a cutoff frequency that is less than or equal to half of the baud rate, thereby generating a bandlimited modulated digital signal; and
converts the bandlimited modulated digital signal into a first optical analog signal; and
optically multiplexes the first optical analog signal of the first optical channel with a second optical analog signal of a second optical channel from the plurality of optical channels to generate a multi-channel optical signal carrying data.

24. An optical communication method, comprising:
generating two or more bandlimited modulated digital signals of an equal baud rate in an electrical domain that respectively carry different signal channels, wherein each bandlimited modulated digital signal is generated by:
mapping data using a quadrature phase shift keying (QPSK) constellation into a modulated signal;
upsampling the modulated signal to generate an upsampled signal; and
filtering the upsampled signal using a digital super-Nyquist lowpass filter having a cutoff frequency that is less than or equal to half of the baud rate to generate a respective bandlimited modulated digital signal, wherein the digital super-Nyquist lowpass filter comprises a cascade of a digital lowpass filter and a square root raised cosine (SRRC) filter, and wherein the digital lowpass filter is configured to reduce channel cross-talk among the different signal channels;
converting the two or more bandlimited modulated digital signals of the equal baud rate in the electrical domain into two or more different optical signals at different optical wavelengths, respectively; and
optically multiplexing the two or more optical signals to generate an output optical signal for transmission in an optical wavelength division multiplexed link or network, the output optical signal having a channel spacing less than baud rate of the two or more optical signals.

25. The method as in claim 24, wherein:
the optically multiplexing of the two or more optical signals to generate the output optical signal is free from using an optical wavelength selective device.

26. The method as sin claim 24, wherein the digital lowpass filter includes a quadrature duobinary (QDB) delay and add filter.

* * * * *